May 28, 1940.　　　　J. HERTRICH　　　　2,202,378
POWER TRANSMISSION DEVICE
Filed May 14, 1936　　　10 Sheets-Sheet 1

INVENTOR.
Joseph Hertrich
BY
Emery, Varney, Whittemore and Dix
ATTORNEYS.

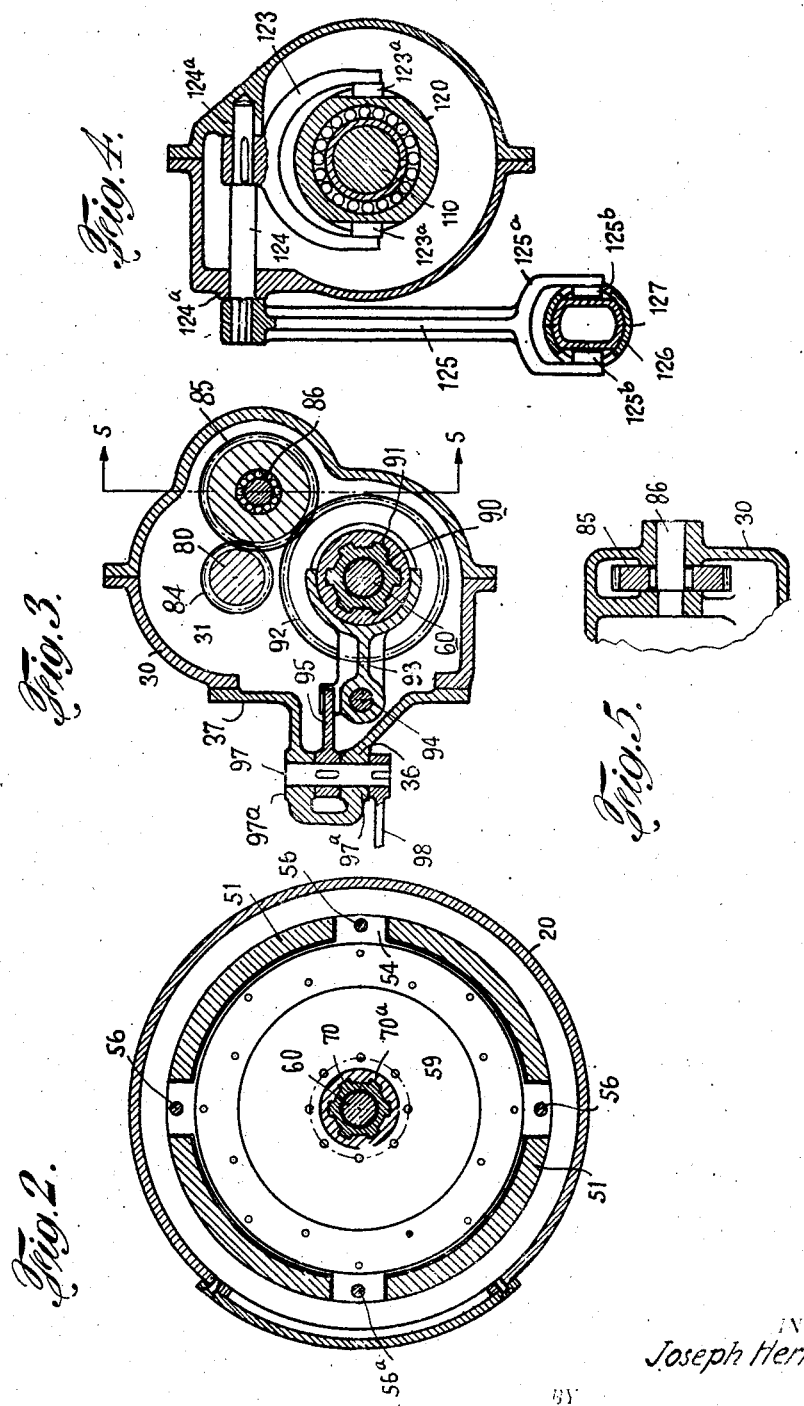

May 28, 1940.                    J. HERTRICH                    2,202,378
                         POWER TRANSMISSION DEVICE
                         Filed May 14, 1936          10 Sheets-Sheet 3
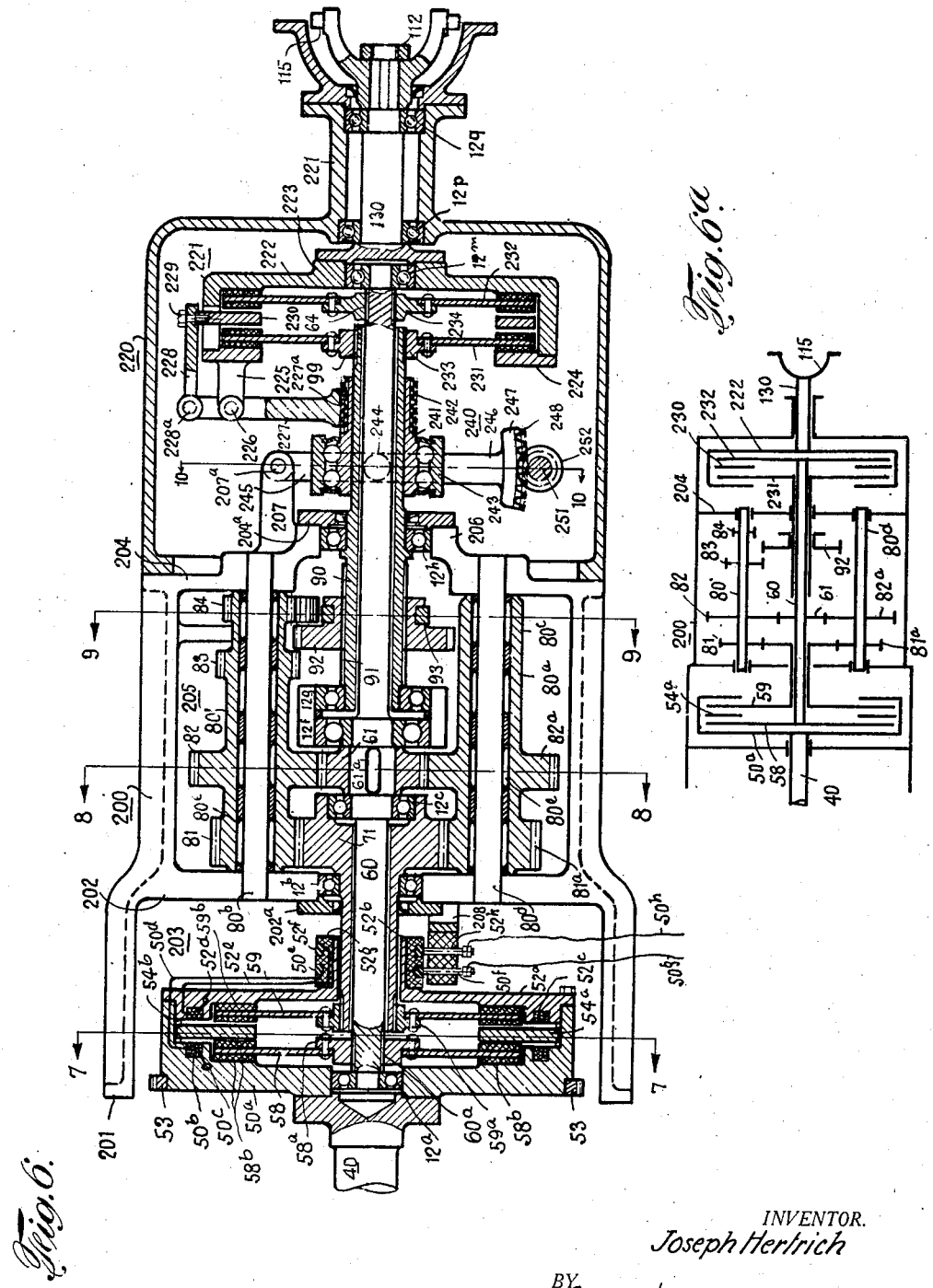
INVENTOR.
Joseph Hertrich
BY Emery, Varney, Whittemore and Dix
ATTORNEYS.

May 28, 1940.  J. HERTRICH  2,202,378
POWER TRANSMISSION DEVICE
Filed May 14, 1936    10 Sheets-Sheet 4
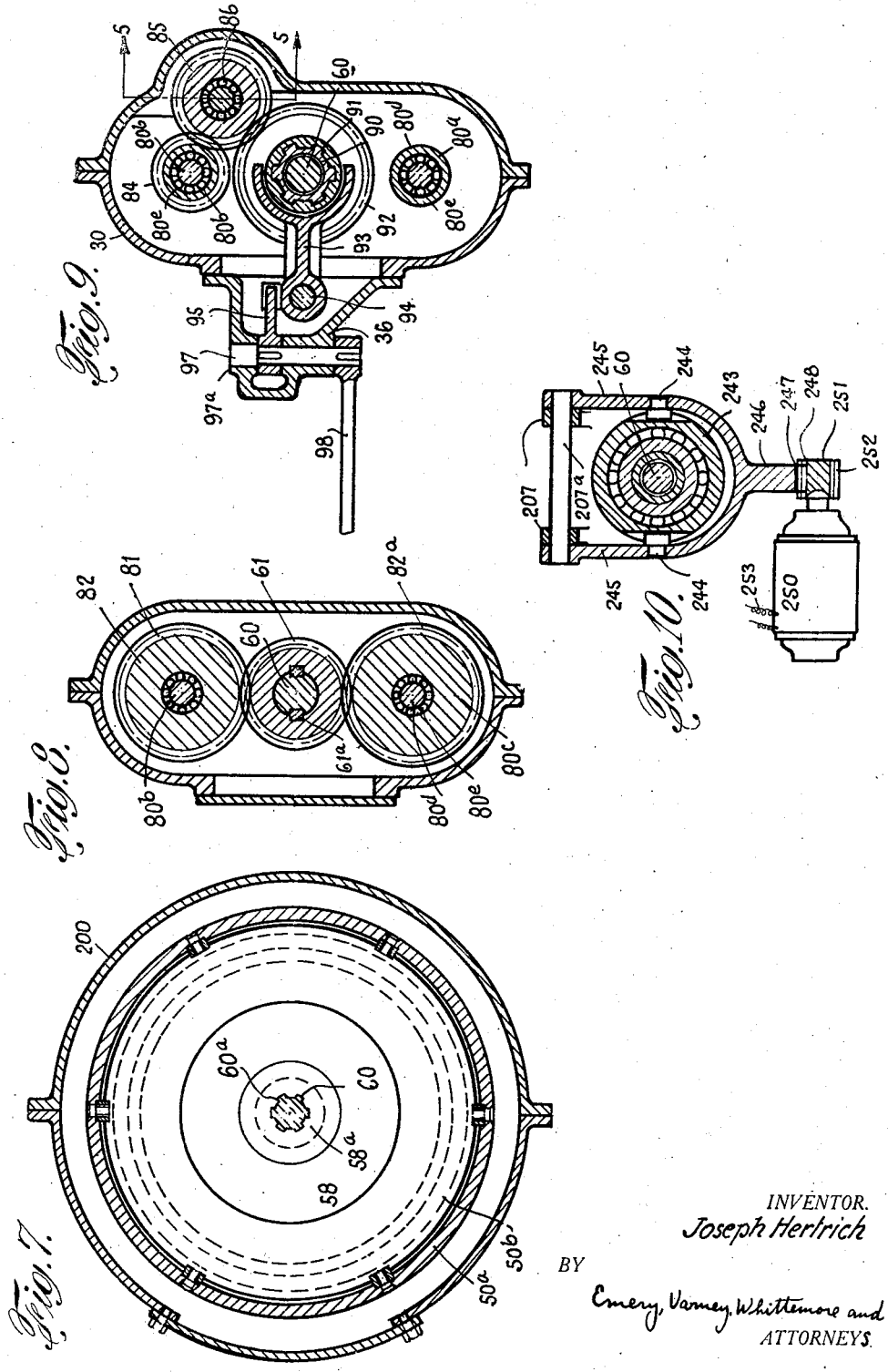
INVENTOR.
Joseph Hertrich
BY
Emery, Varney, Whittemore and Dix
ATTORNEYS

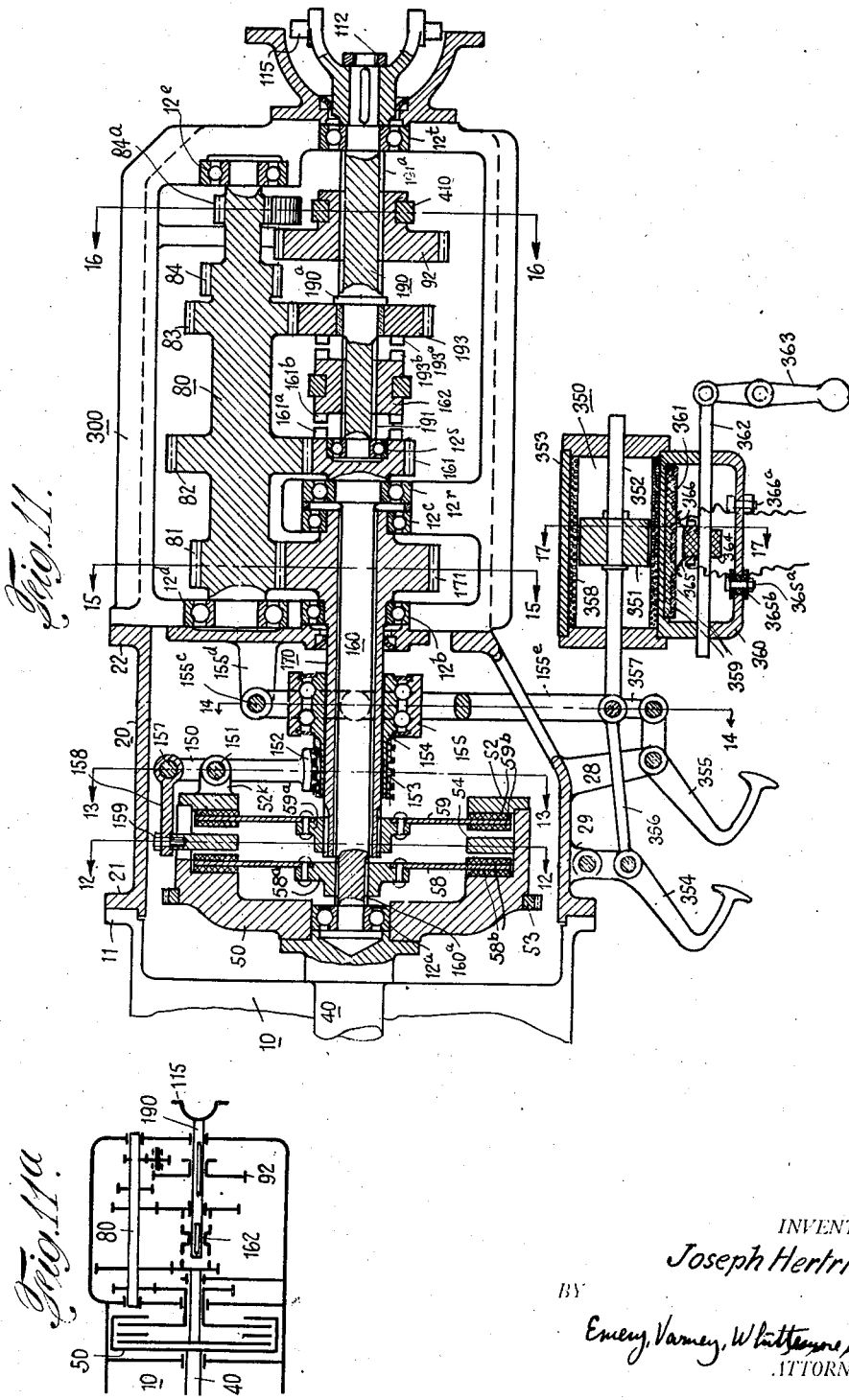

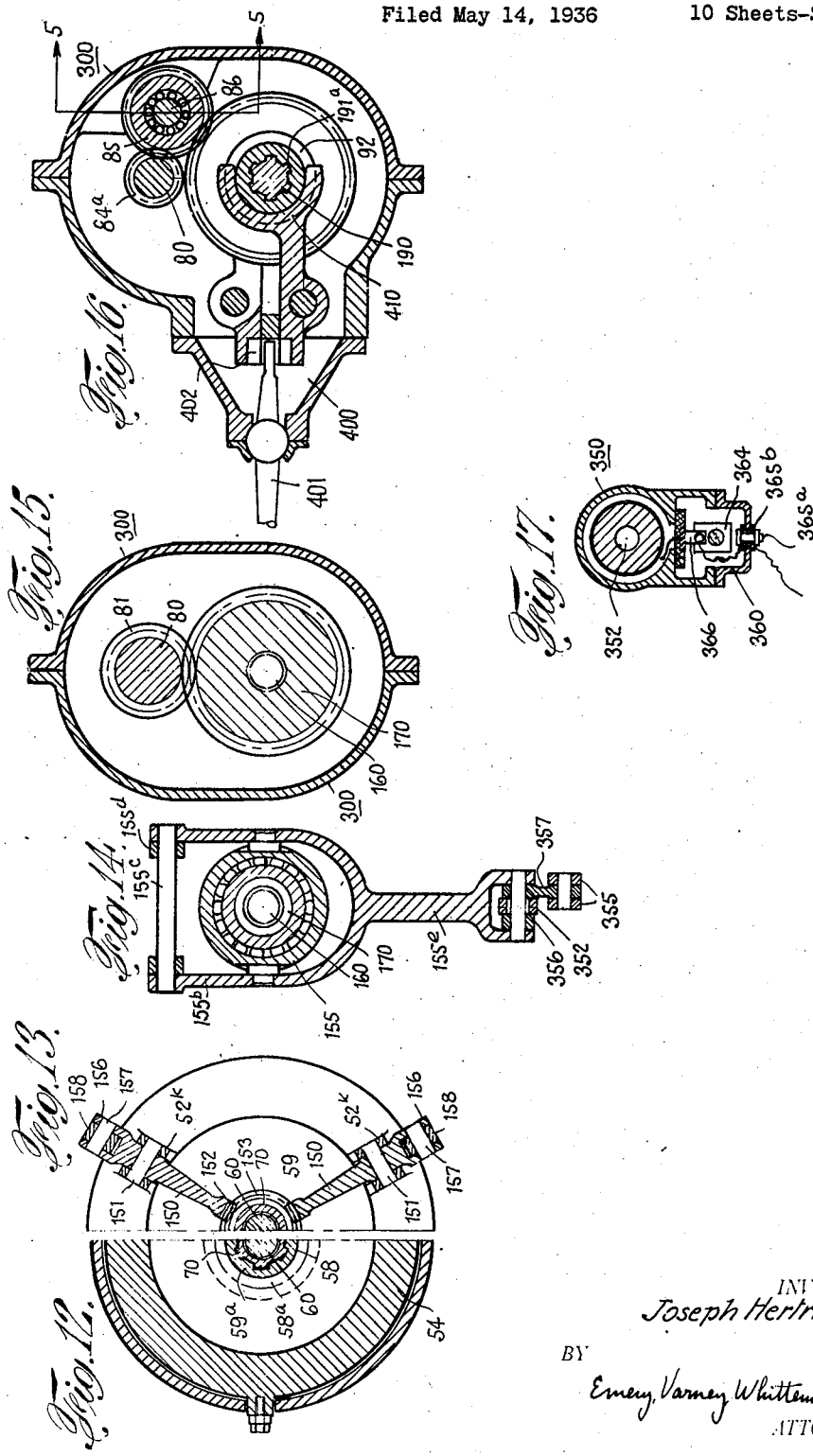

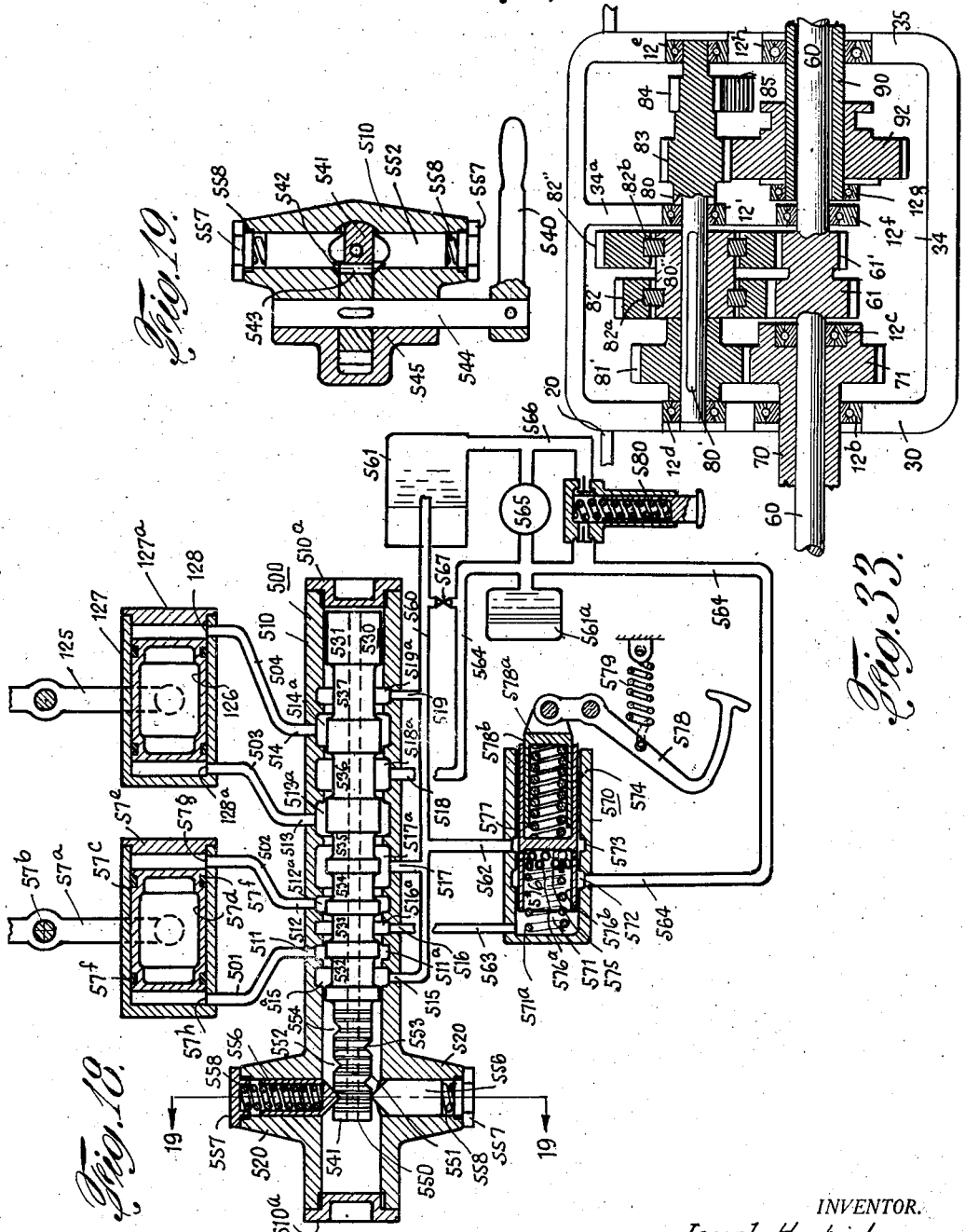

May 28, 1940. J. HERTRICH 2,202,378
POWER TRANSMISSION DEVICE
Filed May 14, 1936 10 Sheets-Sheet 8
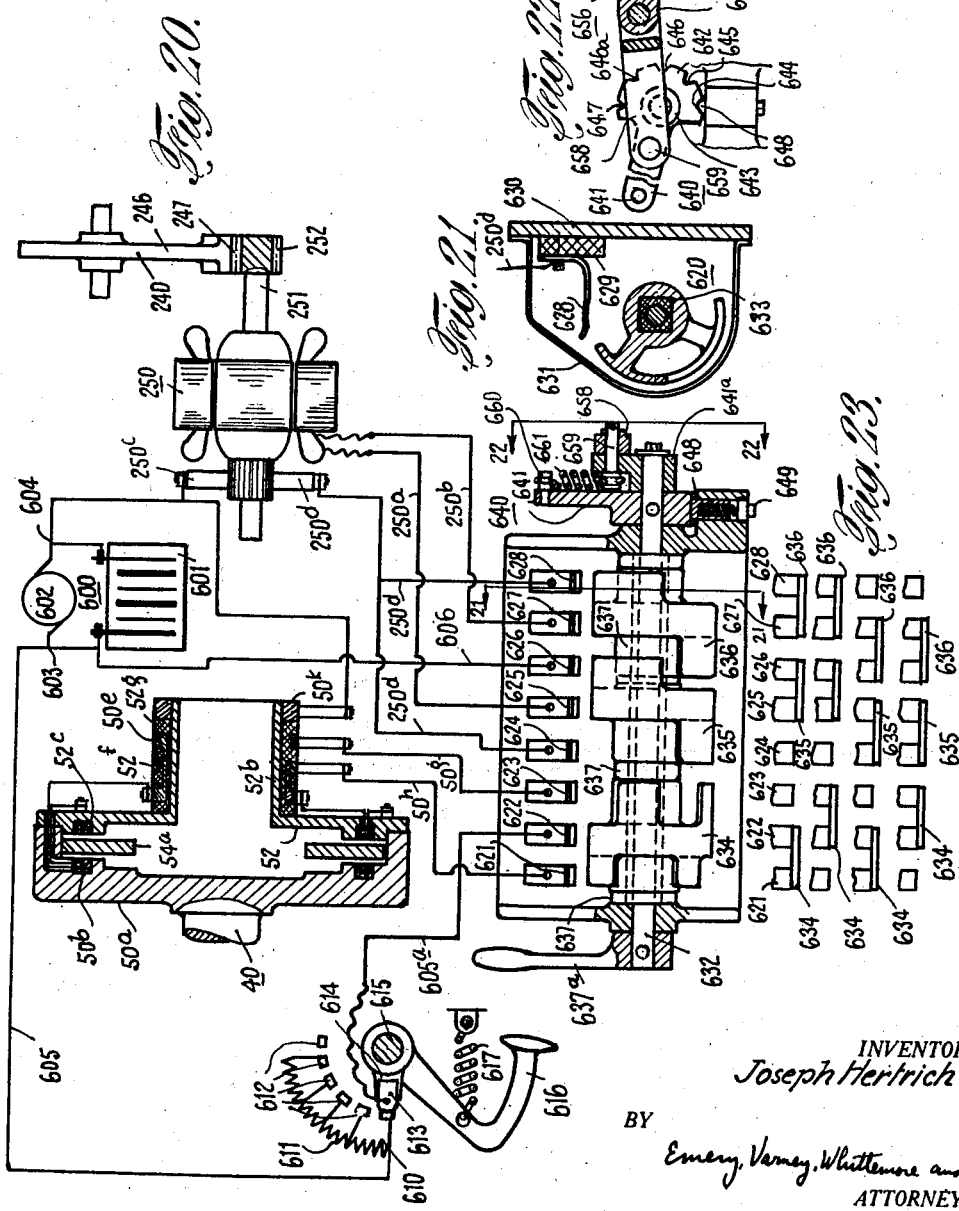
INVENTOR.
Joseph Hertrich
BY
Emery, Varney, Whittemore and Dix
ATTORNEYS.

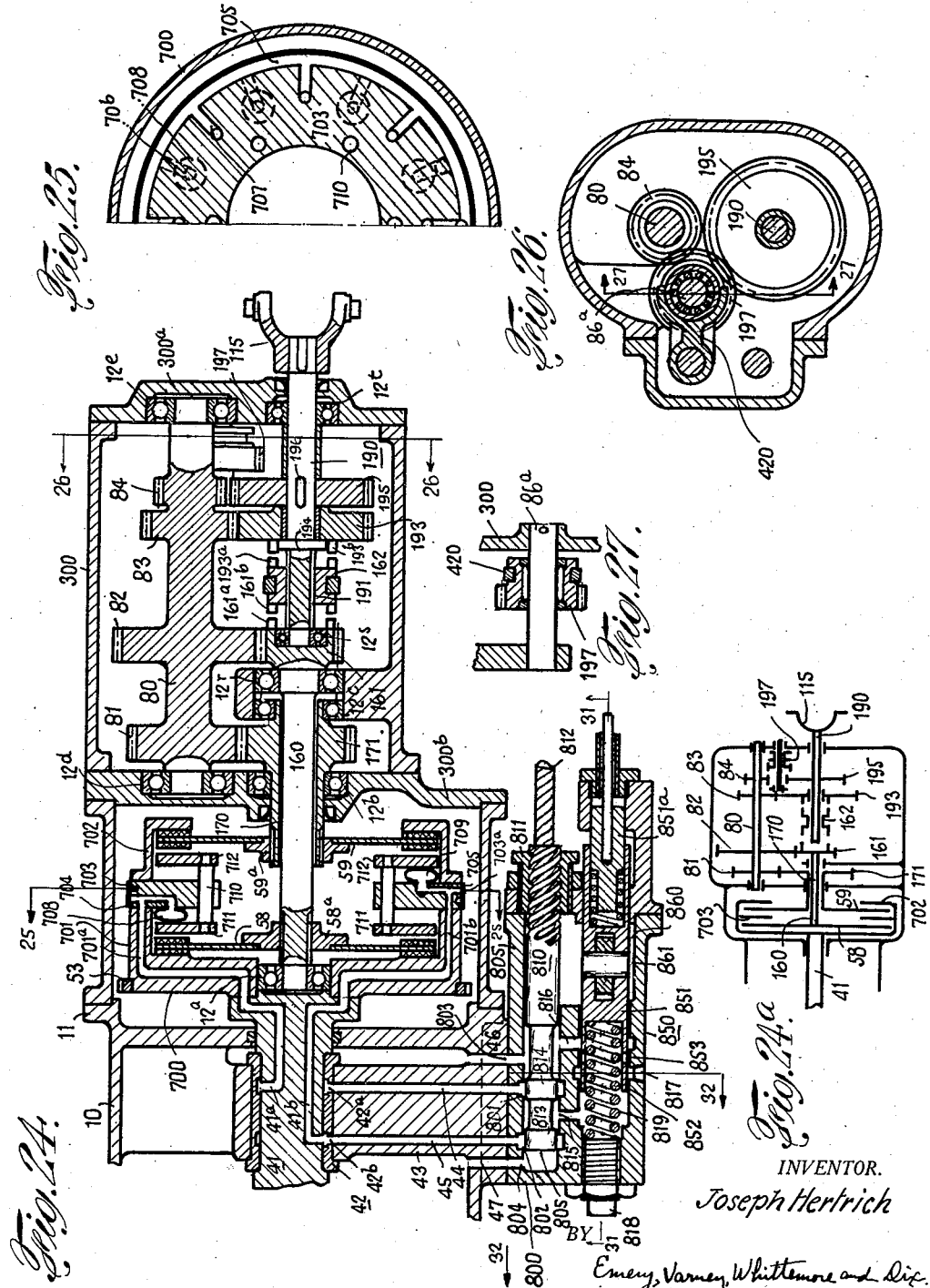

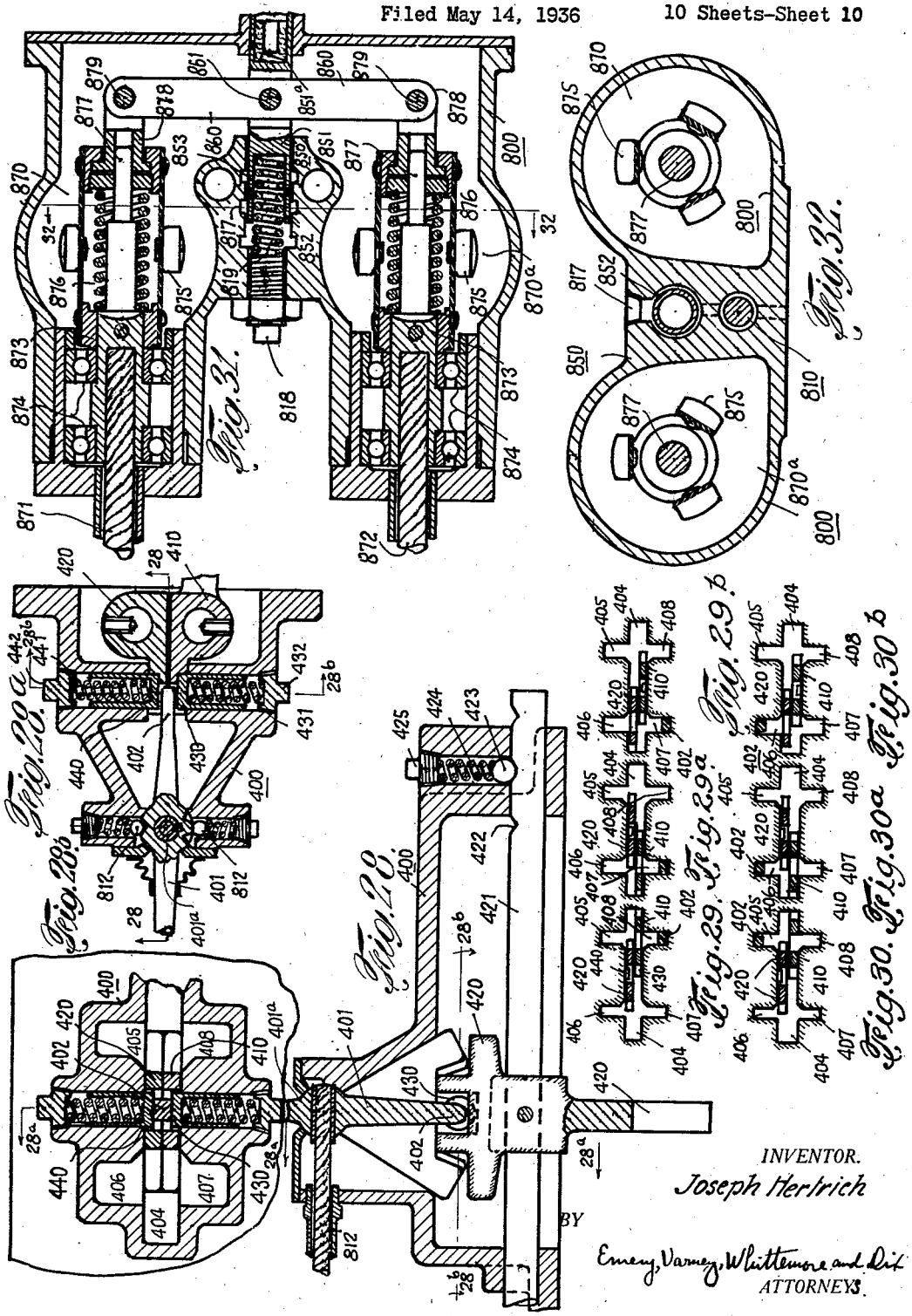

Patented May 28, 1940

2,202,378

UNITED STATES PATENT OFFICE 2,202,378

POWER TRANSMISSION DEVICE

Joseph Hertrich, Mantua, N. J.

Application May 14, 1936, Serial No. 79,668

13 Claims. (Cl. 74—330)

This invention relates to improvements in power transmission systems, but more particularly to variable speed power transmission systems and apparatus for operating same.

Hitherto power transmission systems have been characterized by a number of disadvantages. In the case of automobiles an appreciable time period is involved in the hand shifting of gears. The clashing of gears can only be done away with by the more skilled drivers. In addition, shifting of the clutch every time a change in speed is made, requires further time periods.

These general disadvantages in the prior power transmission systems are done away with by the constructions hereinafter to be described, in which the older speed boxes are now modified to permit the operation of the same and effect change in speeds through gear ratios solely, or for the most part, by the action of appropriate clutching elements and without involving gear shifting mechanisms.

The new constructions herein permit more speeds to be utilized and faster change from one speed to another, and particularly in heavy vehicles. With all of these desirable conditions and features automatic clutching may be utilized, thereby eliminating the ordinary use of a foot clutch.

It is an object of this invention to provide variable speed power transmission systems with a great number of speed ratios and a minimum number of gears and operating parts.

It is also a feature of novelty of this invention to provide in such systems means for effecting faster changes of speeds and with a minimum amount of effort.

A feature of novelty is the use of extra "freewheeling" gear mechanism to increase the number of gear ratios available.

A further feature of novelty of this invention is the provision of means for providing faster starting pickups.

Another feature of novelty of this invention is the provision for increasing the top speed ratio for so-called "overdrive", without adding a special gear drive.

Yet another feature of novelty of the present invention is the provision of a gear shifting mechanism actuated without a clutch pedal and permitting the use of a brake pedal for one foot and an accelerator pedal for the other foot.

A further feature of novelty resides in the provision of means for causing the automatic engagement of the clutch, depending upon the combined effect of the motor speed and car speed.

It is also a feature of novelty of the present invention to effect automatic shifting from one speed to another both in acceleration and deceleration.

It is an additional feature of novelty of this invention to provide a single shifting lever for the multiple control and operation of the gear shifting mechanism and the friction-clutch mechanism.

Another feature of novelty is the provision of a shifting mechanism so designed and arranged as to cause the automatic disengagement of the friction clutch when gears are shifted.

Another feature of novelty is the provision of means for reversal of power flow by utilizing certain gears for the transmission of power in two directions when operating different ratios.

Further features of novelty include means for manually controlling the automatic clutching at predetermined engine speeds and associating necessary regulating mechanism with dashboard control members.

Another feature of novelty resides in the use of double friction clutches whose elements are normally not contacted and are kept in contact by suitable operative means, including mechanically, electrically or hydraulically actuated mechanisms, or any combination of the same.

These and other desirable features and advantages will be described in the accompanying specification and illustrated in the drawings, certain preferred variable speed power transmission systems being shown incorporated in means for effecting the same. These showings are given by way of example only, for, since the underlying structural features may be incorporated in other specific systems, it is not intended to be limited to the ones here shown, except as such limitations are clearly imposed by the appended claims.

In the drawings like numerals refer to similar parts throughout the several views, of which Fig. 1 is a vertical longitudinal section, partly in elevation turned 180° from its normal operating position, of a variable speed power transmission system as adapted for motor vehicle use;

Fig. 2 is a vertical section through forward clutch mechanism taken on line 2—2 of Fig. 1;

Fig. 3 is a vertical section through gear train housing and taken on line 3—3 of Fig. 1;

Fig. 4 is a vertical section through rear clutch shift mechanism taken on line 4—4 of Fig. 1;

Fig. 5 is a vertical section through a reversing gear mechanism and taken on line 5—5 of Figs. 3, 9;

Fig. 6 is a view similar to Fig. 1 showing electrically actuated clutch mechanism and modified rear clutch mechanism with two countershafts for additional power;

Fig. 6a is a schematic diagram of the power flow obtaining in the transmission system of Fig. 6;

Fig. 7 is a vertical section through the magnetic clutch mechanism taken on line 7—7 of Fig. 6;

Fig. 8 is a vertical section through the gear housing taken on line 8—8 of Fig. 6;

Fig. 9 is a vertical section taken on line 9—9 of Fig. 6 and showing reversing mechanism;

Fig. 10 is a vertical section, partly in elevation, of rear clutch operating mechanism taken on line 10—10 of Fig. 6;

Fig. 11 is a view similar to Fig. 1 showing a modified form of power transmission system and electrically-operated mechanical clutch;

Fig. 11a is a schematic diagram of the power flow obtaining in the transmission system of Fig. 11;

Fig. 12 is a half vertical section of the clutch mechanism of Fig. 11 taken on line 12—12;

Fig. 13 is a half vertical section taken on line 13—13 of Fig. 11, showing the clutch plate control mechanism;

Fig. 14 is a vertical section taken on line 14—14 of Fig. 11, showing the control for operating the thrust bearing of the clutch mechanism;

Fig. 15 is a vertical section through the main gear drive and taken on line 15—15 of Fig. 11;

Fig. 16 is a vertical section taken on line 16—16 of Fig. 11, and showing the reversing mechanism;

Fig. 17 is a vertical section taken on line 17—17 of Fig. 11, showing the electromagnetic clutch control;

Fig. 18 is a vertical section, partly schematic and partly in elevation, through a hydraulically controlled clutch operating device;

Fig. 19 is a vertical section, partly in elevation, of a control means for the device of Fig. 18 and taken on line 19—19 thereof;

Fig. 20 is a schematic showing in vertical section, partly in elevation, of an electric clutch operating mechanism with switch mechanism therefor;

Fig. 21 is a vertical section of electric drum switch taken on line 21—21 of Fig. 20;

Fig. 22 is a vertical section of an automatic shifter taken on line 22—22 of Fig. 20;

Fig. 23 is a schematic arrangement of the operative positions of the drum-switch members of Fig. 20;

Fig. 24 is a partly vertical section shown 180° from its normal position of a power transmission and associated hydraulic clutch operating mechanism and automatic control means therefor;

Fig. 24a is a schematic diagram of the power flow obtaining in the transmission system of Fig. 24;

Fig. 25 is a half transverse section taken on line 25—25 of Fig. 24;

Fig. 26 is a transverse section taken on line 26—26 of Fig. 24 and showing reversing idler control;

Fig. 27 is a sectional view of sliding reversing idler gear taken on line 27—27 of Fig. 26;

Fig. 28 is a vertical section of combined gear and clutch control;

Fig. 28a is a vertical section taken on line 28a—28a of Figs. 28 and 28b;

Fig. 28b is a horizontal section taken on line 28b—28b of Figs. 28 and 28a;

Figs. 29, 29a, 29b, 30, 30a and 30b are diagrammatic showings of clutch and gear shift control positions;

Fig. 31 is a vertical section of an automatic governor control mechanism taken on line 31—31 of Fig. 24;

Figures 1, 1A:
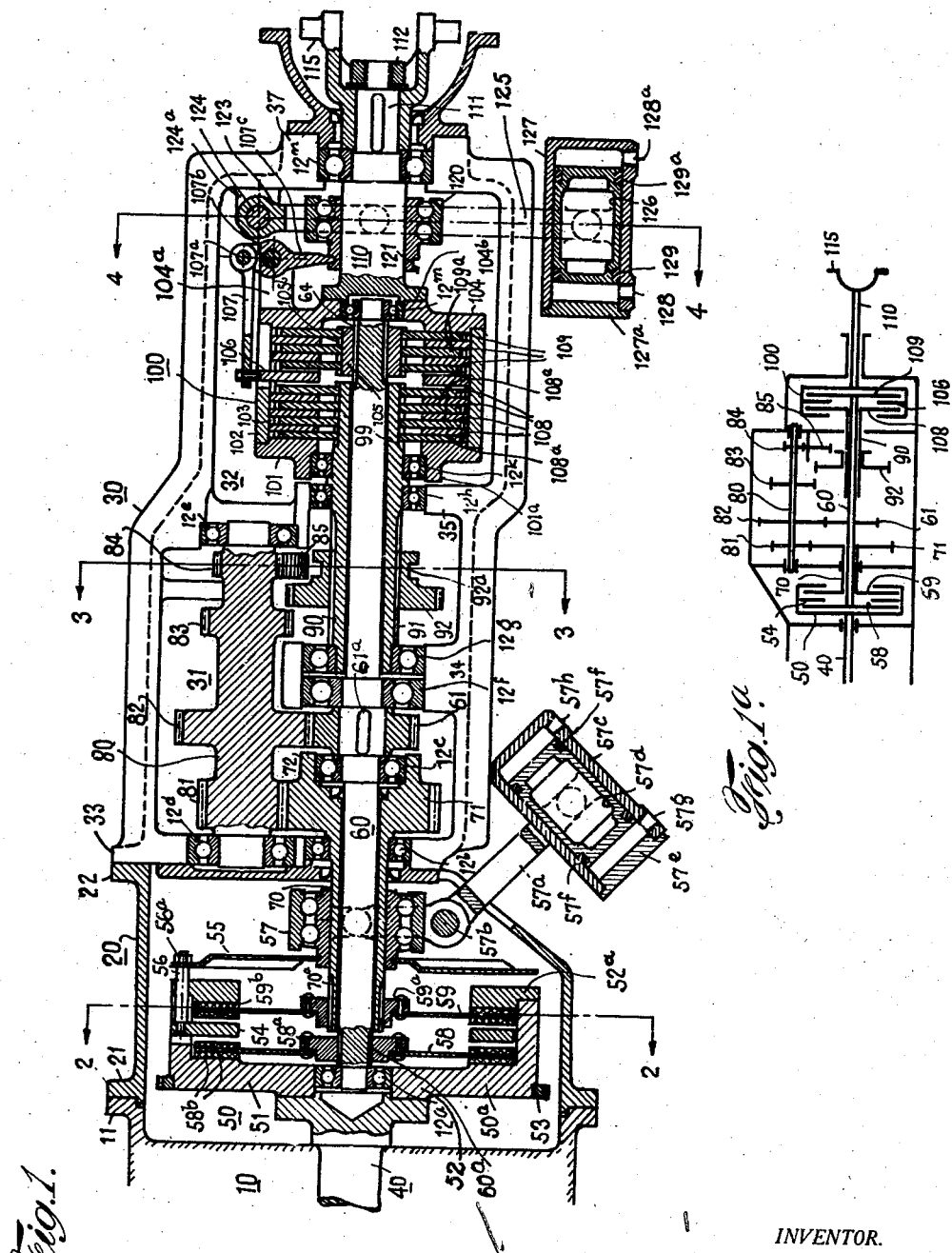
Fig. 1a is a schematic diagram of the power flow obtaining in the transmission system of Fig. 1.

Fig. 32 is a vertical section taken on line 32—32 of Figs. 24 and 31, rotated 180°, and Fig. 33 is a vertical section, shown 180° from its normal position, through a modified gear box showing "free-wheeling" gear mechanism to increase number of gear ratios available.

Considering the structure shown in Figs. 1 to 5, inclusive, the invention herein will be considered with respect to an automobile gear-box arrangement disposed between sets of clutches.

The operative parts of the system will now be described. An engine casing 10 is suitably joined to a forward clutch casing 20, which, in turn, is secured to a two-part casing 30, including a central chamber 31 and rear chamber 32. The forward clutch housing 20 has an annular flange 21 adapted to mate with and engage a similar flange 11 formed on the engine housing, the members secured in any desired manner. A rear flange 22 abuts against a flange 33 of the combination gear train and rear clutch housing 30. The engine shaft 40 is connected to a forward clutch mechanism 50, which, in turn, can be connected either to a main shaft 60 or a hollow drive shaft 70. The shaft 70 may be connected to a gear shaft 80 which is adapted to be connected through suitable gears to a rear hollow drive shaft 90. A rear clutch mechanism 100 can be operatively connected through suitable mechanism to either the shaft 60 or the shaft 90. The rear clutch body 100 connects with the universal joint 115 through output shaft 110. The foregoing parts above generally designated, will be described more in detail hereinafter, both as to their particular structure and the mode of cooperation. The shafts 60, 70, 80, 90 and output shaft 110 are mounted in ball-bearings, designated generally by the numeral 12 and supported in the housing 30, and between themselves.

Considering the specific structures more in detail, the forward or engine clutch assembly 50 comprises a cover or clutch body portion 51 having a central hub 52 secured to the engine drive shaft 40 and seating ball-bearing 12a to which the forward end of shaft 60 is secured, thus enabling shaft 60 to rotate freely in and independently of the clutch body 51. The clutch body also includes a rear apertured cover or annular end-plate 52a fastened to the clutch body, a starter ring gear 53, a clutch-disk or friction-plate 54, as well as a thrust plate 55 secured to the friction-plate by means of studs 56 and nuts 56a. The thrust-plate 55 is mounted on and adapted to rotate with the inner race of thrust-bearing 57, surrounding and slidable along shaft 70. A clutch disk 58 is mounted on hub 58a, which, in turn, is splined onto shaft 60 by means of splines 60a. Annular clutch disk friction linings 58b are provided on either side of the clutch disk 58 and are adapted to engage the inner face 50a of clutch body 51 and the forward face of clutch-plate 54. A second clutch disk 59, provided with friction facings 59b is mounted on a hub 59a which is splined onto and adapted to rotate with shaft 70, being in engagement with splines 70a thereon.

The thrust bearing 57 is controlled by a control or operating lever 57a mounted on shaft 57b. The lever 57a is connected to a hydraulic plunger 57d in cylinder 57c. Taps 57g and 57h are provided at either end of the cylinder to permit the ingress and egress of hydraulic fluid. The plunger is provided with sealing rings 57f.

The gear train in the rear housing 31 will now be described. The hollow drive shaft 70 concentric with the main shaft 60 and disposed therearound, is mounted in ball-bearing races 12b. A second bearing 12c is mounted on shaft 60 and engages recessed annular end 72 of gear 71 formed on the end of the hollow shaft 70. Gear teeth are provided on the circumference of this gear member 71. The shaft 70 will be seen to be mounted on and supported by the shaft 60 and is adapted to rotate concentrically therewith and independently thereof, and around its external supporting bearing.

A countershaft 80 is mounted in casing 30, being supported in aligned relation in ball-bearings 12d and 12e set in the casing 30. This countershaft is provided with gears 81, 82, 83 and 84. Gear 81 is in mesh with gear 71 of drive shaft 70, while gear 82 is in mesh with gear 61 mounted on shaft 60 and keyed thereto, as indicated at 61a. Bearing 12f supports shaft 60 on the rear side of the gear 61 and this bearing is mounted in a boss 34 of member 30. An idler gear 85 is mounted on a stud shaft 86 and is constantly in mesh with the gear 84 of countershaft 80.

A second concentric drive shaft 90 is mounted on bearings 12g and 12h in the bosses 34, 35 of casing 30. Shaft 90 is fixed to the inner race of bearing 12g and is provided with splines 91 adapted to receive sliding gear 92. This sliding gear is provided with an annular groove 92a adapted to receive shifting-fork 93 and be moved thereby along shaft 90 into and out of engagement with gear 83 or idler gear 85. This arrangement permits the use of the gear train for reversal when desired. The shifting-fork 93 is mounted on a shaft 94 which shaft is controlled by control lever 95, the latter being keyed to shaft 97 set in journals 97a which are set in bosses 36 of the casing cover 31. The shaft 97, in its turn, is controlled by lever 98, which is directly controlled by a hand lever, or other means, not shown. The hollow shaft 90 is provided at its other end with a bearing 12k supporting the clutch-plate or body 101 of clutch mechanism 100. The end of the shaft 90 disposed within the clutch body 100, is splined, as indicated at 99, to receive clutch disks 108, to be referred to more in detail hereinafter.

The clutch mechanism 100 comprises a clutch end-plate 101 having a hub 101a secured to the outer race of bearing 12k. A clutch ring 102 is secured to the clutch end-plate and is provided with inner splines 103. An end-plate 104 is secured to the clutch body and is mounted on the outer race of bearing 12m, the inner race of which is secured to the end of drive-shaft 60. A splined hub 105 is fitted onto splines 64 of drive-shaft 60. The hub 105 is also provided with outer splines 105b. The end-plate 104 is provided with end-plate lugs 104a adapted to receive a clutch-control mechanism. The clutch mechanism includes a friction clutch-plate 106 mounted on arms 107, which, in turn, are mounted on pins 107a and connected to and adapted to be operated by swivel levers 107b rotating on pins 107c set in between end-plate lugs 104a, above referred to. Splined friction-disks 108 are mounted on shaft 90 and held in place by splines 99 thereof. These disks alternate with other splined friction-disks 108a, which are mounted on splines 103 of the clutch ring. A second set of friction-disks 109 are slidably mounted on splines 105b of sliding hub 105 and are adapted to frictionally engage friction-disks 109a slidably mounted on splines 103 of the clutch ring. The clutch-plate or friction-plate 106 of the double friction clutch 100 can be moved into position to cause the friction disks 108, 108a to mutually engage or can be moved to cause the frictional engagement of friction-disks 109, 109a.

The mechanism for controlling the double friction-clutch includes the lever arms 107 and associated parts mounted on lugs 104a of the clutch body. These parts are adapted to be operated by thrust-bearing 120 having the inner race slidably secured onto the output shaft 110, which is secured to the inner hub 104b of end-plate 104 and abutting the outer race of bearing 12m. The output shaft 110 is mounted in a bearing 12n set in boss 37 of the clutch housing 30. The universal joint fork 115 is keyed onto the end 111 of the output shaft and locked thereon as by means of nut 112. The inner race of thrust bearing 120 is provided with a thrust-groove 121 adapted to receive the drive or control fingers 107d of the swivel lever control arms 107 controlling the friction clutch-plate 106. The thrust-bearing 120 is slidably mounted on shaft 110 to permit this longitudinal motion. A fork 123 of the control mechanism is suspended from shaft 124 mounted on bosses or lugs 124a of the housing. The forks are provided with studs 123a adapted to engage slots or grooves in the outer race of thrust-bearing 120. The forks are connected through shaft 124 to control or operating lever 125 mounted on the outside of the casing and keyed to shaft 124. The control lever 125 is provided with a forked end 125a having studs 125b adapted to engage hydraulic plunger 126 of the hydraulic cylinder 127. This cylinder is provided with a cover 127a. Taps 128 and 128a are provided on either side of the cylinder to control the plunger. Seal rings 129, 129a are secured to the plunger to prevent leakage of hydraulic operating fluid.

The cooperation and operation of the above assembly is substantially as follows. When the hydraulic cylinder 57c is set in operation by introducing pressure fluid through the inlet or tap 57g the plunger 57d is moved, carrying the operating lever 57a to the right. This lever rocks on the shaft 57b and causes the thrust-bearing 57 to be moved towards the engine. The thrust-bearing 57 carries with it the thrust-plate 54. This latter plate is moved towards the body of the clutch and grips the friction facings 58b of the friction disk 58 forcing the latter into frictional engagement with the clutch body 51. The friction-disk 58 being splined onto central shaft 60 establishes direct connection from the engine shaft 40. By lever 98 sliding gear 92 is moved on shaft 90 to engage gear 83. This power is applied through the shaft 97 and arm 95 immediately controlling the shifter-fork 93. This operation places the hollow drive shaft 90 in the power train from the engine through the central shaft 60 and countershaft 80. This power train is connected to the output shaft 110 through the double friction output clutch 100 as follows: hydraulic pressure is applied to hydraulic cylinder 127 through tap 128, forcing cylinder or plunger 126 to the right. Lever 125 is thereby moved to the right, carrying with it thrust-bearing 120 which operates swivel lever 107b and arm 107 to move friction-plate 106 to left, causing friction-disks 108a and 108 to frictionally engage with clutch end-plate 101. Friction disks 108a are splined onto hollow shaft 90 and thus a power train is established between the engine shaft and the output shaft. This hookup gives a low gear or first speed.

To move into second speed the operation of the parts is as follows: hydraulic pressure is applied on plunger 57d through tap 57h moving the parts to the left and carrying operating lever 57a in the same direction. This operation causes the movement of thrust-bearing 57 to the right, taking with it thrust-plate 55 and friction-plate 54. This movement releases clutch-plate 54 from engagement with friction-disk linings 58b of clutch disk 58 and moves it over into contact with clutch disk 59 which is splined onto hollow drive shaft 70. The pressure of plunger 126 is not changed, thereby maintaining the output shaft in direct engagement with the second hollow drive shaft 90. It will be seen that in this arrangement of the parts the power is transmitted from the engine shaft through the forward clutch to first hollow shaft 70 and gear 71 and gear 81 on countershaft 80 through gear 83 and sliding gear 92, second hollow drive shaft 90 and clutch-body 100 to the output shaft 110.

To obtain third speed, which is the direct speed, the hydraulic plunger 57d is again moved to the right by introducing pressure fluid through tap 57g; thrust-plate 55 is moved to the left, freeing clutch-disk 59 and causing the reengagement of friction-plate 54, clutch-disk 58 and clutch-body 51, thus reestablishing connection between engine shaft 40 and central drive shaft 60. Hydraulic plunger 126 is also moved to the left by introducing pressure fluid through tap 128a. Lever 125 is carried to the left, moving thrust-bearing 120 in the same direction and thereby causing friction-plate 106 to disengage friction-disks 108, 108a and causing it to engage disk 109, 109a in locking engagement. Friction-disks 109 are splined onto hub 105, which in turn is splined onto the end of central drive shaft 60. Thus, it will be seen that the engine shaft and an output shaft are directly connected without the intermediacy of any gear train.

The fourth speed, or overdrive, is obtained by releasing friction-clutch disk 58 and locking clutch-disk 59, which as already noted, is accomplished by introducing pressure fluid into inlet 57h of hydraulic cylinder 57c. The rear clutch mechanism is maintained as in direct connection, establishing direct power connection between the terminal end of central drive-shaft 60 and the output shaft 110. The power train in this arrangement is from engine shaft 40 through the forward clutch 50, first hollow drive shaft 70, gear 71, gear 81 and countershaft 80 to gear 82, and gear 61 directly secured to the drive shaft 60, which, as noted, is directly connected to the output shaft.

The method of securing the two reverse speeds with this improved clutch-and-gear assembly will now be described. The initial step in this arrangement is to move sliding gear 92 into engagement with idler gear 85 by means of hand lever 96. This operation brings the reversing gear train into use. The first reverse speed is obtained by directly connecting the engine shaft with central drive-shaft 60 through clutch-disk 58. This, as previously noted, is accomplished by introducing pressure fluid into hydraulic cylinder 57c through tap 57g. In like manner, pressure fluid is introduced into hydraulic cylinder 127 through tap 128, causing thrust-bearing 120 to be moved to the right and friction-plate 106 to lock friction-disks 108 and 108a together, thus connecting second hollow drive shaft 90 through clutch-body 100 to the output-shaft 110. In this arrangement it will be seen that power flows through first clutch-body 50, central drive shaft 60, gear 82, countershaft 80 and gear 84 to idler gear 85, which causes a reversal of power flow through sliding gear 92 to second hollow drive-shaft 90, causing this shaft to counter-revolve with respect to central drive-shaft 60. This reversed power flow is transmitted by hollow drive shaft 90 to the double-friction clutch-body 100 and output-shaft 110.

For the second reverse speed the first clutch is reversed, releasing the direct connection from the engine shaft to the central drive-shaft 60 and establishing direct driving connection to the engine-shaft through the first hollow drive-shaft 70. In this arrangement the power flow is through the first clutch system 50 to the hollow drive-shaft 70, gear 71, gear 81 and countershaft 80 to gear 84, idler gear 85 and reversing direction. This idler gear engages sliding gear 92, causing reversal of direction of the rotation of the second hollow drive-shaft 90, which is locked in driving engagement with friction-disks 108, 108a of clutch member 100, which is in direct connection with the output shaft.

It will now be seen that the transmission system described in and illustrated in Figs. 1 to 5, inclusive, provides a mutual interlocking of the parts so that for each forward speed each of the double friction clutches in clutch-body 100 must be locked in one or the other position, and, at the same time, each clutch can only be locked in one position at any given time. This gives a fool-proof clutch-shifting arrangement for forward drive, without any speed-interlocking device.

The specific friction clutch construction should be strong enough for the purpose desired and can be operated hydraulically, as shown, or by any other method. These operations can be accomplished manually or automatically. There is a practical and very important difference in the operation of the two-friction clutches 50 and 100. The first clutch 50 takes the engine torque directly, at all times. This clutch is so designed and built as to work under variable pressure and to permit any desired sliding of the friction disks for satisfactory operation of the car. To accomplish this purpose the friction surfaces, as shown, are and must be large enough to prevent rapid wear and overheating caused thereby. In addition, the clutch members must be of correct size and design to properly and rapidly dissipate any frictionally engendered heats. The variable pressure on the input clutch members can be obtained by varying the hydraulic pressure on hydraulic plunger 57d of operating cylinder 57c. Clutch 100 and its parts, constitute essentially a locking device. Smaller surfaces are required for the torque transmission and no sliding or slipping of the parts is required. As the result of these factors a constant high-surface pressure can be applied to the contacting surfaces. Thus this fixity of parts and operation makes it possible to use a small diameter clutch-body with any kind of friction-plates. The variation of the friction coefficient with speed has no appreciable influence on the operation of this output clutch.

The transmission system above described gives four forward speeds and two reverse speeds, although only requiring eight gears. Each gear is used for at least two different speeds. It is to be noted, however, that all forward speeds are obtained without shifting gears and solely by means of operation of the clutch members, and preferably and desirably in the sequence noted immediately above. In addition, only one shifting of gears is required for the two reverse speeds. These advantageous features are further enhanced by the fact that the changes from one speed to another are both fast and smooth. The inclusion of an over-drive in this transmission system provides for a lower engine speed at high speeds of the vehicle.

It will, of course, be understood that any arrangement of gears may be utilized to give desired speeds, and in any desired sequence of operation.

Referring now to Figs. 6 to 10, both inclusive, there is shown a modified power transmission system and assembly. In this modification, now about to be described, the gear box proper is provided with two countershafts to permit the use of the assembly for heavy-duty purposes, as well as for ordinary light-car use.

In the form shown schematically in Fig. 6a and in detail in Fig. 6, a two-or-more-part casing 200 is provided with a forward annular flange or flanges 201 adapted to abut or engage an engine body, a central partition member or members 202 defining a forward magnetic clutch chamber 203 with the engine body, and a second or rear partition wall 204 forming an inner gear chamber 205 with the external walls and the first partition wall 202. The so-formed chamber is adapted to house the gear train and to be substantially hermetically sealed so that the gear box may be filled with suitable lubricants. The partition walls 202 are apertured to receive fixed shafts 80b and 80d and the walls 204 are also apertured to receive the same shafts. The end or partition wall 204 has a central hub section 206. This member is also provided with a pair of lugs or arms 207 which will be referred to more in detail hereinafter. A rear clutch housing 220 receives the rear clutch mechanism and is secured to the gear box 200, being abutted against and secured to the wall 204 thereof. The casing 220 is provided with rear hollow extensions 221 adapted to support and receive bearings 12p and 12q, respectively, which serve as supports for the output shaft 130.

The forward chamber 203 houses a magnetic clutch 50a connected to engine drive shaft 40. This clutch has a rear cover 52a terminating in a collar 52b concentric with the first hollow drive shaft 70. The usual friction-disks 58 and 59 are mounted on the ends of central drive shaft 60 and hollow shaft 70, respectively. A friction clutch-plate 54a is disposed in the clutch body 50a and adapted to engage splines 54b formed therein. The body portion 50a of the clutch body is provided with an annular channel containing a solenoid or magnetic winding 50b. The cover plate 52a is similarly channeled to receive a like solenoid 52c. These solenoid windings are grounded to the respective parts of the clutch housing, as indicated at 50c and 52d, respectively. Leads 50d and 52e connect these solenoids to commutator rings 50e and 52f, respectively, mounted in insulating ring 52g on collar 52b of the clutch casing. Brush members 50f and 52h are secured in lug or stud 208 of gear casing wall 202 and are suitably insulated. These brushes are provided with leads 50g and 50h connected to suitable switch mechanism, as shown generally in Figs. 20, 21 and 23. The ground connections of the clutch body are also connected in a manner to permit the solenoids 50b and 52c to be alternately connected when desired. The arrangements just described provided a magnetic clutch control for the input end of the unit or the forward clutch mechanism. As was previously noted, a certain amount of flexibility or variation in pressure between the clutch members and the driving and driven members, is desirable in the clutch connected directly to the engine shaft. This can be readily taken care of in present instance by varying the amounts of magnetic flux developed in the solenoids 50b or 52c. The clutch casing members are preferably made of ferrous materials or other materials having suitable magnetic permeability to permit the same to cooperate with the clutch-plate 54a to effect the frictional holding of the friction-disks 58 and 59 in the clutch mechanism. The gear train in the present modification comprises the usual gear 61 mounted on central drive shaft 60 and gear 71 mounted on hollow drive shaft 70. The gears 81, 82 and 83, previously described, together with reversing gear 84 are mounted on a hollow shaft 80' which is rotatably mounted on a fixed shaft 80b supported between the partition walls 202, 204 of the gear chamber and supported for rotation on the shaft by means of bearings 80e. A second countershaft 80d is supported in a manner similar to shaft 80b and oppositely thereto in alignment with shafts 60, 70 and 90 and opposing and balancing the power thrust normally delivered through rotary hollow shaft 80' and associated gear members. This shaft rotatably supports a hollow gear shaft 80c through bearings 80e. The hollow shaft 80c is provided further with gears 81a in mesh with gear 71 of hollow drive shaft 70, and gear 82a in mesh with gear 61 of central drive shaft 60. As power is delivered to the gear train through these gears 71 and 61, it will be seen that the provision of a pair of countershafts with gears constantly in mesh, will provide a static balance between the shaft 80b and 80d and the hollow gear shafts 80a and 80c, preventing any buckling due to unbalanced loads on one side of the gear chamber, and thus permitting heavier loads to be imposed on the gear train. The usual reversing mechanism is provided.

The rear clutch housing 220 contains a rear clutch mechanism 221 having a dished body portion 222 and a central apertured hub 223 and an annular cover-plate 224. The hub 223 is secured to the output shaft 130 in the usual manner and receives the end bearing 12m for the central drive shaft 60. The annular cover-plate 224 is provided with a plurality of lugs 225 supporting stub shafts 226, which serve as pivots for operative levers 227 of the clutch-plate 230. The clutch-plate is connected to the levers 227 through the arms 228 fulcrumed on shafts 228a and secured to the clutch-plate 230 by means of bolts 229. The two clutch disks 231, 232, are respectively mounted on splined hubs 233, 234, which splines are adapted to slidingly engage splines 99 and 64 formed on the ends of drive shafts 90 and 60, respectively.

The clutch mechanism 221 is controlled by thrust-block mechanism 240 which includes an inner race 241 having transverse teeth or rack members 242 adapted to engage like members 227a formed in the bottom of clutch arm 227. The outer race 243 of the thrust block 240 is slotted to receive studs 244 of yoke 245 which is fulcrumed on stub shaft 207a fixed in lugs 207 of the gear casing partition 204. The yoke arms 245 converge to form a common Y or bottom leg 246 which is provided on its bottom with an arcuate arm or rack 247 having transverse teeth 248 therein. The teeth 248 of rack 247 are adapted to engage pinion teeth 252 of a reversing motor 250. The pinion gear 252 is mounted on shaft 251 of the motor and the latter is connected through 253 to a reversing switch shown in Fig. 20. The gear casing may be provided with locking means such as plugs or end caps 202a and 204a, respectively adapted to lock bearings 12b and 12h in operative position and are provided with means to prevent leakage of lubricant from the gear chamber 205.

It will be seen that by utilizing the reversing motor 250 the lever 246 can be moved to the right or to the left, to cause the operative engagment of either driving shaft 60 or driving shaft 90 with the clutch 221, and the output shaft 130.

The operation of the transmission system just described, is as follows: When a suitable switch is thrown so that current is passed through clutch lead 50g, solenoid 50b is energized and clutch-plate 54a moved into frictional engagement with friction-disks of clutch-disk 58. This connects the engine shaft directly with the central drive shaft 60. If current is applied through lead 50h, solenoid 52c is energized and moves clutch-plate 54a into frictional engagement with friction-disk 59, thereby connecting the engine shaft through the clutch body to hollow drive shaft 70. As noted before, second clutch body 221, in its turn, and usually in advance of the input clutch members, is electrically controlled through the reversing motor 250 to permit direct takeoff of power from central drive shaft 60 or second hollow drive shaft 90, which is connected through the gears mounted on gear shaft 80a to the first hollow drive shaft 70. In the reversed positions the sliding gear 92 of hollow drive shaft 90 engages the idler gear of the reversing mechanism. As already noted the sliding gear 92 is moved into forward-drive position on engagement with gear 83 or into reverse drive position by engagement with the idler gear 85 by means of fork 93 of the gear control mechanism. It will be again noted that in the operation of this modification, as before, the utilization of a gear ratio is effected by appropriate combinations of the clutch members, the single, positive gear control being effected through sliding gear 92 to determine forward speeds or reverse speeds.

It will be seen that for first speed, power is transmitted from the engine shaft 40 to output shaft 130 through the first clutch body 50a, friction disks 58, central drive shaft 60, gears 61, 82, countershaft 80', gear 83, sliding gear 92, hollow drive shaft 90, friction disk 231, clutch body 221 to output shaft 130.

In the second speed the power flow is from engine shaft 40, clutch body 50a, friction disk 59, hollow drive shaft 70, gears 71, 81, gear shaft 80', gears 83 and 92, second hollow drive shaft 90, friction disk 231 and clutch body 221 to output shaft 130.

For direct drive, both clutches are reversed. Motor 250 is reversed, and thereby locks friction disk 232 into operating engagement with second clutch body 221 and output shaft 130 connected thereto. Friction disk 58 is locked to clutch body 50a, thereby connecting central drive shaft 60 directly to engine shaft 40.

For the fourth forward drive or so-called "overdrive", the first clutch is operated to lock friction plate 59 into engagement with the clutch body 50a, thereby switching hollow drive shaft 70 into operative engagement with engine shaft 40; second clutch 221 remains operatively connected to central drive shaft through friction disk 232. Power is transmitted from first hollow drive shaft 70 through gear 71 to gear 81 and 81a, gear shafts 80', 80a and gears 82 and 82a to gear 61 and central drive shaft 60 to the rear clutch body 221. It is to be noted that no interlocking device is required for forward speeds, as each speed requires a definite cooperation of the parts which is effected through the shaft in the association of the several clutch parts without requiring any shifting of gears. As the clutch parts are alternately arranged and only one in each of the two groups can be operatively connected, there is no opportunity for trouble arising from improper or double connection of parts in any of the clutch devices.

For reverse speeds the sliding gear 92 is moved into engagement with the idler gear 85, and friction disk 231 of second clutch 221 is locked to hollow drive shaft 90. For the first reverse speed, friction disk 58 of clutch 50a is locked. Power flows through engine drive shaft 40, clutch body 50a and central drive shaft 60, gears 61 and 82, hollow gear shaft 80', gear 84, idler gear 85 and sliding gear 92, second hollow drive shaft 90, friction disk 231 and clutch body 221 to output shaft 130. For the second reverse speed friction disk 59 of clutch body 50a is locked thereby connecting hollow drive shaft 70 to the engine shaft 40 through the clutch body 50a. Power is transmitted from shaft 70 to gear 71 and gear 81 to gear shaft 80', gear 84, idler gear 85, sliding gear 92, second hollow drive shaft 90, friction disk 231 and clutch body 221 to output shaft 130.

It will be noted that with this transmission four forward speeds and two reverse speeds are obtained. This transmission has the same advantages as the one shown in Figs. 1 to 5. The chief difference is in the electrical operation of the clutches and the inclusion of an additional countershaft in the gear box. This additional countershaft permits the increase of the horse power capacity of the transmission. If the strength factor on the gears has to be increased, the number of gears on the hollow countershaft 80a may be correspondingly increased. In such case a second reverse idler can be inserted to mesh with this gear on the second countershaft.

The first clutch, as already described, is a variable pressure clutch to permit smooth action when engaged. The second clutch can be a constant high-pressure clutch and does not have to be designed to take care of heat dissipation.

Considering the double clutches generally, it is to be noted that the details of the operative mechanisms therefor may be varied in any desired manner without departing from the teachings of the present invention. Thus the clutch controls may be operatively connected on either side of the clutch body.

Referring now to Figs. 11 to 17, there is shown a speed transmission with a number of ratios. This transmission is characterized by two input shafts and a double friction mechanical clutch which is preferably magnetically operated. The gear train is provided with a double sliding clutch. In this assembly, which is primarily designed for heavy-duty vehicles, such as engine-driven cars, trucks, buses, and the like, the engine shaft is connected through a double clutch body alternately to a central driving shaft and a hollow drive shaft. The central drive shaft may be directly connected by means of a double clutch to the output shaft or to the gear shaft in the gear box. This latter shaft may be connected through a sliding gear on the output shaft and a reversing idler gear. This combination gives double the number of speeds in a transmission without making the operation of the same at all complicated and provides a faster pickup, enabling the most efficient use of the engine power and a longer service of the engine. As noted, the transmission system about to be described, is particularly adapted for use in trucks and buses. This particular transmission provides six forward speeds and two reverse speeds. There are but three shifting operations required for the six forward speeds. The change from first to second speed, from third to fourth speed, and from direct speed to "overdrive," can be effected swiftly and without slowing the engine down. This is of marked advantage on the starting of the vehicle, also when going uphill and in uneven country, as well as going down steep grades and on long runs, where the "overdrive" can be used to slow down the engine. These features of novelty and advantage in efficient operation, upkeep and longevity of parts, will be more clearly understood by reference to the assembly of the various features.

The transmission system incorporated in the showings of Figs. 11 to 17, comprises a gear box or oil-tight housing 300, of two or more parts, abutted against and fitted to the adaptor or forward clutch housing 20, which in turn is secured to the engine casing 10. The input clutch mechanism comprises the usual clutch body 50 which is preferably of dish or cup shape and secured to the engine shaft 40 and is of sufficient weight to permit it to serve as a flywheel, which may also be true of the other input clutch bodies hereinabove described. A starting ring gear 53 is secured to the clutch body. An annular cover member 52 is secured on the rear of the clutch body and is provided with a plurality of lugs 52k in which friction-plate control arms 150 are fulcrumed on stub shafts 151. These control arms are provided with arcuate gears 152 on one end, meshing with suitable teeth 153 on the inner race of thrust bearing 154 of thrust block 155 and the upper ends are provided with forks 156 carrying stub shafts 157, on which second lever arms 158 are fulcrumed, which arms are secured to the clutch-plate 54a in any suitable manner as by means of bolts 159. The usual friction disks 58 and 59 provided with friction facings 58b and 59b are mounted, respectively, on hubs 58a and 59a, which, in turn, are splined on central drive shaft 160 and hollow drive shaft 170. These drive shafts are mounted in bushings 12a, 12r and 12b, 12c, respectively secured in the clutch body and in the gear casing partition. The thrust block 155 is slidably mounted for free sliding movement on and over hollow drive shaft 170, and the outer race 155a thereof is suspended from yoke arms 155b mounted on stub shaft 155c which is supported on lugs or arms 155d on the input side of gear housing 300. The thrust block actuating yoke has a depending lever arm 155e which is suitably connected to a magnetic clutch-operating device 350, which will be described more in detail hereinafter. Hollow drive shaft 170 is connected to solid gear shaft 80 through gears 171, 81. Gear shaft 80 is mounted in aligned bushings 12d, 12e, set in gear casing body 300. This gear shaft is fitted with gears 81, 82, 83, 84 and 84a. Gear 84a is constantly in mesh with reversing idler gear 85 mounted on fixed stubshaft 86 set in the gear casing.

The shaft 190 in the present arrangement serves the dual function of a transmission shaft and an output shaft. The forward end is mounted in ball-bearing race 12s set for free rotation in the terminal gear 161 of central input shaft 160. This gear 161 is provided with clutch jaws 161a adapted to engage like jaws 161b on double clutch 162. This double clutch member is splined for longitudinal movements on splines 191 of shaft 190. A gear 193 provided with clutch jaws 193a engaging like jaws 193b on double clutch member 162 is mounted for free rotation on shaft 190, being abutted against collar 190a formed thereon. This gear 193 is constantly in mesh with gear 83 of gear shaft 80. The usual sliding gear 92 is mounted on splines 191a on the shaft 190 and is adapted to be moved by fork 410 of gear shaft 400 forwardly into engagement with gear 84 of gear shaft 80 or rearwardly into engagement with idler gear 85 of the reversing gear mechanism.

The solenoid controlled clutch operating mechanism 350 will now be described. This solenoid mechanism comprises a core member 351 fixedly mounted on shaft 352 which passes through casing 353 of the solenoid and is connected to lever or yoke arm 155e and to interconnected control pedals 354, 355, through lever arms 356, 357. The control pedals are mounted on lugs 28, 29, formed on adapter casing 20. The solenoid casing 353 is provided with solenoid winding 358 having a plurality of taps 359, formed in blocks or segments and having their terminals set in insulating block or plate 361 mounted in switch casing 360, set on and secured to the solenoid casing or formed integral therewith. The switch mechanism comprises a switch or slide rod 362 slidably mounted in the switch casing 360 and provided with a hand-controlled lever 363 suitably fulcrumed to the switch lever. The control lever may be mounted on the steering shaft casing or readily adjacent the steering wheel. It also may be mounted directly on the switch box mechanism, and the latter connected through suitable cable connections to the solenoid casing proper. An insulating block 364 is fixed on sliding shaft 362 and adapted to move therewith. Two fingers or commutators 365, 366, are fastened onto the insulating block and are adapted to contact the commutator segment of the solenoid in definite, spaced relation. Terminals 365a, 366a are mounted on the switch casing, one of the terminals being insulated therethrough as by means of insulating bushing 365b, the other terminal being preferably grounded to the casing. It will be seen that by moving the switch block over the solenoid commutator segment the various portions of the solenoid can be energized, and with varying amounts of current flowing therethrough, whereby desired variations in magnetic flux can be induced in the solenoid. This variation in position and density of the magnetic flux in the solenoid causes the solenoid core member 351 to be moved to various positions in the solenoid casing and carry the clutch actuating rod 352 with it. In this movement yoke arm 155e is moved predetermined distances and carries the thrust block to one side or another, and this thrust block movement causes clutch-plate 54 to lock friction disks 58 or 59, respectively, to the clutch body 50. No automatic return of levers 354 and 355 is required, as they are interconnected. The operation of lever 354 brings lever 355 into its operating position, and vice versa. Foot pedal 355 may serve in an emergency as a declutching member and the clutch can be engaged by the foot pedal 354 if the current supplied to the solenoid fails. Normally the solenoid is energized at all times. Lever 354, when pressed, moves yoke arm 155e and thrust block 154 to the left as viewed in Fig. 11, thus moving clutch plate 54 into contact with facings on friction disc 59. This occurs through movement of the lever around its fulcrum on lugs 29, during which motion is transmitted to yoke arm 155e by lever arm 356. At the same time, foot lever 355 is moved around its fulcrum on lugs 28, in a direction opposite to lever 354, by the action of link or arm 357 pivotally connecting the end of lever 355 with yoke arm 155e. Thereafter, lever 355 may be pressed to release the clutch by moving the yoke arm and thrust block 154 to the right, the limit of such motion being at a point where arm 357 is substantially in alignment with arm 155e. At this point the clutch plate 54 is in a neutral position, and in the course of reaching it lever 354 has been restored to its initial position. The neutral position is obtained by moving the solenoid switch to the center of the switch box so that the contact fingers 365, 366, rest on insulating portions of the device and are not in current contact with commutator or switch segments.

As already noted, gear 81 is in constant mesh with gear 171; gear 82 is in constant mesh with gear 161; gear 83 is in constant mesh with idling gear 193; and gear 84a is in constant mesh with reversing idler gear 85. For forward speeds sliding gear 92 meshes with gear 84, while for reverse speeds sliding gear 92 meshes with reversing idler gear 85.

The operation of the clutch mechanism generally is as follows. As noted, an electric current is always impressed on switch terminals 365a, 366a. When the switch lever 363 is in neutral position the contact fingers 365, 366 do not make contact with the coil terminals and no current flows through the solenoid. When the operating lever is moved to the left contact fingers 365, 366, touch some of the contacts 359 at the right of the solenoid mechanism. An electric current is thereby caused to flow through that portion of the solenoid which is in the field between the two contact fingers. The magnetic flux so created pulls the iron core 351 of the solenoid in the center of the magnetic field. When the control lever is moved to the left the center of the magnetic field is shifted accordingly and the iron core carried with it. The lever pushes the thrust block and control lever mechanism and the thrust bearing is moved to the left or right, carrying the friction clutch plate with it. Thus, when the switch control lever is moved to the right the iron core of the solenoid moves to the left and the friction disk 59 is locked by the friction plate and the clutch housing connects the engine shaft 40 to the hollow drive shaft 170. Conversely, when the switch lever is moved to the left the friction disk 58 of the clutch mechanism will be locked to the clutch body by clutch-plate 159 and the engine shaft will be connected through the clutch body to the central drive shaft 160.

In the operation of the transmission the first speed is secured by shifting gear 92 to engage with gear 84. Switch control lever 363 is moved to one side to cause friction disk 58 mounted on central input shaft 160 to be locked to the clutch body 50, thereby connecting the input shaft 160 with the engine shaft 40. Power flows from the engine shaft through the clutch body and the central input shaft 160 through terminal gear 161 to gear 82 mounted on gear shaft 80, thence through gear 84 to sliding gear 92 and output shaft 190 to universal joint 115.

For the second speed the forward clutch is reversed to lock friction disk 59 to the clutch body. This connects the hollow input shaft 170 to the engine shaft 40 through the clutch body 50. The power flow is from the engine through the clutch body to the hollow input shaft and its terminal gear 171 to gear 81, gear shaft 80, gear 84, sliding gear 92, and output shaft 190 to universal joint 115.

For third speed sliding gear 92 is put in neutral and double clutch 162 is engaged with gear 193 which is mounted for free rotation on output shaft 190. Friction disk 58 is locked in position in the clutch body. The power flow is, therefore, from the engine shaft through the clutch body to central input shaft 160, terminal gear 161, gear 82, and gear shaft 80, gear 83, idler gear 193, clutch body 162, output shaft 190 to the universal joint 115.

For the fourth speed, hollow input shaft 170 is locked to the clutch body 50 by friction disk 59. Power is transmitted from the engine shaft through the clutch body to the hollow input shaft, thence through gear 171 to gear 81 and gear shaft 80, gear 83, idler gear 193, double clutch gear 162 and output shaft 190 to the universal joint 115.

For fifth speed the double-clutch body 162 is moved to engage with terminal gear 161 on central input shaft 160. This directly connects the aligned input and output shaft 160 and 190. Clutch disk 58 is locked to the clutch body, thereby establishing direct connection between engine shaft 40 and central input shaft 160. This is the direct speed.

For the sixth or "overdrive" speed, hollow input shaft 170 is locked to the clutch body through friction disk 59. The power flow is thus from the engine shaft through the clutch body and hollow input shaft 170 to gear shaft 80, and gear 82 to terminal gear 161 of input shaft 160 and double clutch 162 to the output shaft 190 and the universal joint 115.

For the first reverse speed sliding gear 92 is moved to engage with reverse idler gear 85; central input shaft 160 is connected to the clutch body through friction disk 58. Power flows from the engine shaft through the clutch body, central input shaft 160 terminal gear 161, gear 82, gear shaft 80, gear 84a, reversing idler gear 85, sliding gear 92 and output shaft 190 to the universal joint 115.

For the second reverse speed clutch disk 59 is locked in position connecting hollow input shaft 170 to the clutch body. The power flow in this operation is from the engine shaft through the clutch body and hollow input shaft to the gear shaft 80 and gear 84a to reversing idler gear 85 and sliding gear 92 to output shaft 190 and universal joint 115.

The arrangement immediately above described gives six forward speeds requiring only three shifting operations. The clutch shift control mechanism gear is operated by the finger and is rapid, efficient and positive in operation. This clutch shift lever may be mounted directly on the gear shift lever.

As noted hereinabove, and more particularly with respect to the mechanical operation of clutch 50 and clutch 100, the actuation of the controlling levers or operating members of such clutches may be effected by hydraulic or like means. Referring more particularly to Figs. 18 and 19, there is shown hydraulic clutch-operating means and valve controls for same. The clutch-operating mechanism includes the clutch lever operating motors or cylinders 57c and 127, both previously described, and severally adapted to operate clutch-plate operating levers 57a and 125, respectively. These clutch operating mechanisms may be directly controlled through a single valve means designated generally by the numeral 500. The valve 500 is connected to piston cylinder 57c by conduits or pipes 501, 502 and to piston cylinder 127 by pipes or conduits 503 and 504. The valve, proper, comprises a body portion 510 of generally cylindrical shape having end closures or caps 510a, and provided at one end with a flattened T or cross-extension having lugs or bosses 520 adapted to receive valve piston actuating and locking means which will be described more in detail hereinafter. The valve body 510 is provided with a plurality of taps adapted to permit ingress and egress of actuating fluid into and out of the valve body and designated by the numerals 511 to 519, both inclusive. A valve piston 530 is fitted in the valve body 510 and is so designed as to permit appropriate fluid connections to be made between the several apertures described immediately above. This piston or valve member includes a body portion 531 of generally cylindrical configuration and adapted for sliding fit in the interior of the valve body. The piston member is provided with a plurality of surface depressions of generally annular shape and of varying width or depth, adapted to span similar depressions formed on the interior wall of the valve body. As shown, the valve body is provided with a plurality of interior annular depressions 515a, 511a, 516a, 512a, 517a, 513a, 518a, 514a and 519a, severally connecting with like-numbered apertures above cited. The valve piston 531 is machined or otherwise formed to give a plurality of annular depressions or valve portions 532, 533, 534, 535, 536 and 537, whose function and cooperation with the internal annular depressions of the valve body will be considered in the discussion of the operation of the valve.

The valve piston or operating member is operated by a control lever 540 in the following manner. A spindle or shaft 541 is formed on one end and as a continuation of the valve piston 530. This section, or member 541, may be generally rectangular in cross-section and is provided on the top surface with a toothed rack 542 adapted to be engaged and moved by toothed wheel 543 keyed on shaft 544, which is mounted for rotation in boss 545 formed on the end of the valve body 510. The rack and wheel are keyed to the hand lever or other control 540. The shank or spindle section 541 is provided further with staggered lateral depressions 550, 551, 552, 553 and 554 severally adapted to be locked by opposed spring-urged locking members 556 disposed in the bosses or lateral projections 520 of the valve member and adapted to be retained in position by caps or locking members 557. The spring-urged locking pins 556 are generally hollow and have coil springs 558 disposed therein and in abutment with the end caps 557. The locking members 556 are alternately adapted to engage the locking notches 550 to 554, respectively, when the valve piston 531 is shifted longitudinally of the valve body by means of the control handle or lever 540 controlling the rack-and-pinion assembly 542, 543. By appropriate movement of the control handle 540 any of the locking notches 550 to 554 may be moved into locking engagement with the locking pins 556, thereby setting up appropriate connection between the valve body and the associated outlets, as will be described further in detail.

The operating fluid supply and distribution system for the valve 500, will now be described. The valve openings 515, 517 and 519 are connected to a common header pipe 560 which is in direct connection with a liquid reservoir 561, and through a T-connection 562 to a pressure-regulating valve 570. Opening 516 of the valve 500 is directly connected through pipe 563 to inner chamber 571 of the pressure-regulating valve. Opening 518 of valve 500 is connected through pipe 564 to pressure pump 565, emergency pressure pump 580, and return to pressure-regulating valve 570. The pressure pump 565 may be connected to the engine in any suitable manner and is tapped into and between feed line 566 leading from reservoir 561 and supply line 564. An auxiliary pressure chamber or pressure accumulator 561a may be tapped into the line 564. The pressure accumulator is usually partially filled with air. The emergency pump 580, as noted, is tapped in between supply pipe 566 and distribution pipe 564. An expansion or relief valve 567 may be inserted between pipe 560 and pipe 564. The pressure-regulating valve 570 has an inner chamber 571 provided with annular channels 572 and 573 into which pipes 564 and 562 are respectively connected. Pipe 563, as already noted, connects pump 570 with valve channel or groove 516a of valve 500. The valve plunger 574 is of generally cylindrical construction and is provided with a central web 575 dividing the member into two chambers 576, 577. Chamber 576 is provided with a plurality of holes or apertures 576a adapted, upon appropriate movement of the plunger, to establish fluid contact between pipes 564, 562 and valve chamber 571. A spring 571a may be inserted in chamber 576 and acts to apply pressure on plunger 574. An apron portion 576b is adapted to overlie channel or groove 572 in the valve body and prevent flow of liquid through pipe 564. The plunger is actuated by foot pedal 578 fulcrumed to an auxiliary plunger 578a, which is fitted in main plunger 574. The member 578a is provided with a spiral spring 578b disposed therein. The pedal 578 is secured to or held in position by means of a retaining spring 579 so that connections are established between pipes 563 and 564.

In normal position the plunger 574 of pressure-regulating valve 570 is kept in the down position by means of springs 578b and 579, which are more powerful than spring 571a, which is only required to overcome any operating friction in the plunger. The holes 576b in the plunger 576 then connect pipe 564 to pipe 563. In this way full pressure developed by pump 565, is applied on the shifting valve at 516a and 518a. With valve plunger 531 in normal position, as shown with locking pins 556 in notch 550, the flow of hydraulic operating fluid through pipes 563 and 564, is cut off by the plunger 531. If the valve plunger 531 is moved into the second position with one of the pins 556 in the notch 551, line 564 is connected to pipe 503 and line 563 is connected to pipe 501. In this position it will be seen that pressure is applied to the left side of each of plungers 57d and 126. Simultaneously pipe 504 is connected to pipe 519 and pipe 502 is connected to pipe 517. This connection connects the right side of each of the clutch operating plungers to the return pipe 560. With this operation the two double clutches of the gear transmission are engaged in one position. If valve piston 531 is moved so that notch 552 is locked by pins 556, the pressure on plunger 57d is reversed and the plunger is shifted to the left. The plunger 126 remains in the same position. If the piston valve 531 is moved again to locked position determined by notch 553 and pins 556, the pressure on plungers 57d and 126, is reversed. Plunger 126 moves to the left and plunger 57d moves to the right. When the valve plunger is again moved so that notch 554 is engaged by pin 520 the pressure on plunger 57d is again reversed and the plunger pushed to the left. The plunger 126 will remain on the left side. The five locking notches on the valve plunger 531 determine the five different and definite relative positions of the two plungers 57d and 126, which respond to the different ratios in the transmission. As here shown, the different positions are as follows:

| | | Piston 57d | Piston 126 |
|---|---|---|---|
| 1 | Neutral | Center | Center. |
| 2 | First speed | Right | Right. |
| 3 | Second speed | Left | Do. |
| 4 | Third speed | Right | Left. |
| 5 | Fourth speed | Left | Do. |

If, for any reason, pressure on the first double clutch 50 is to be decreased or nullified while the vehicle is in motion, or that this condition occurs on starting to allow the clutch to slide, such condition can be obtained by appropriate pressure on foot pedal 578. Under normal operating conditions plunger 574 is kept in the down position by springs 578b and 579. In this position full hydraulic power is applied on the plunger 574. However, this pressure is equalized by spring 578b. When the foot pedal is actuated, this spring pressure is released and the hydraulic pressure in chamber 571 with the held of auxiliary spring 571a, pushes plunger 574 outwardly, thereby partially obstructing connection between pipes 564 and 563 and at the same time connects pipe 563 with pipe 562, through apertures 576a. This position permits a flow of fluid through pipe 562 to the return line 560. The pressure in line 563 drops and, at the same time, the pressure on plunger 57d which is supplied by line 563, will also drop. The drop in pressure on plunger 57d is in direct proportion to the pressure applied on foot pedal 578. By pressing the pedal all the way down the pressure on 57d will be brought down to zero. From this it will be noted that pedal 578 can be used directly in substantially the same manner as the regular clutch pedal of an automobile and with substantially the same, or better, final results. A distinct improvement in operation alone, as a result of the mechanism just described, resides in the fact that the variation of pressure is distributed over a large portion of the movement and the foot pressure required is reduced. In fact, it will be seen that the valve member 570 functions, at least in part, as a servo-motor control means. As a result much smoother driving is secured, due to the absence of jerkiness in operation.

The pressure-regulating valve 570 may not only be operator-controlled, but may be operated automatically by suitable means such as a centrifugal regulator operating from the engine. Such a regulator can be designed and installed to operate in such a manner that with the engine idling, pressure is cut off, but as soon as the engine is speeded up pressure may be applied to the clutch in proportion to the engine speed. In like manner the shift valve plunger 531 may be automatically operated by a regulator driven from the rear of the vehicle with a speed corresponding to the wheel speed of the vehicle. If the car speed increases to a predetermined point, the regulator will have enough force to shift the valve member one notch, and as further increases in speed are registered, appropriate shifting of the valve member 531 may be effected until top speed is attained. Conversely, as the car slows down the spring-balancing regulator will have enough force to cause the transmission to be shifted back to a lower speed. It is to be noted that the present invention comprehends the balancing of the weights and springs of the operating parts here described, and entering into the automatic shifting of gears in such a way as to produce, or give rise to an appreciable difference in speed between the shifting to a higher speed and the shifting back again to lower speeds, in order to provide comfortable driving. It is to be noted, further, that the automatic operation of the shifting valve and regulating valve may be used in combination with manually operated valves in such a manner as to require manual operation only in case of an emergency. It is to be noted, further, that the features of the present invention permit the adjusting of the automatic regulating valve so that the driver can regulate the speed at which the clutch will engage while driving.

The automatic engine speed and car speed control of shifting, will be described further hereinafter, with specific reference to the constructions shown in Figs. 24 to 32, respectively.

In the drawings, and more particularly in Figs. 20 to 23, inclusive, there is shown an electric operating mechanism for two double clutches, such, for example, as may be applied and utilized in the control and operation of the transmission shown in Fig. 6 and described hereinbefore.

Referring more particularly to Fig. 20, there is shown more or less diagrammatically, the double clutch therefor. In this arrangement, the forward clutch 50a and rear clutch operating lever 240 are shown connected to electric starting system 600 by means of a drum switch 620. The immediate and direct control of the input and output double clutches is as follows. The clutch-plate 54a of magnetically controlled clutch 50a is provided with the solenoid coils 50b and 52c, previously described, and with leads 50g and 50h. In addition, a separate ground or slip ring 50k is secured onto the cover plate 52 and serves as a common negative return for the current. The source of electric current designated generally by the numeral 600, comprises the usual automobile storage battery 601 or generator 602 motivated by the engine during operation. Positive terminal 603 and negative terminal 604 are common to both the storage battery and the generator. Split lead 605, 606, connects the positive pole with rheostat 610 and switch contact 626 of drum switch 620. The rheostat 610 comprises a plurality of resistance windings, designated generally by the numeral 611, severally connected to contacts 612. A contact member 613 is mounted on insulating arm 614, and the latter, in turn, is mounted on shaft 615, the whole being adapted for movement by foot pedal 616, which is held in normal operating position by means of spring 617. The movable contact plate 613 is provided with a lead 605a. The drum switch 620 includes a plurality of contact members 621 to 628, both inclusive, mounted on an insulating support 629, which, in turn, is mounted on a rear panel member 630 of the drum switch. A housing 631 is provided to cover the switch. The rotary switch includes a central shaft 632 of steel or other structurally strong material, an insulating shaft 633 usually of square cross-section and continued over the steel supporting shaft, and keyed thereto in any suitable manner. Three switch elements 634, 635 and 636 are mounted on the insulating shaft 633 and are spaced apart from each other by insulating spacers designated generally by the numeral 637. The switch elements 634, 635 and 636 are generally arcuate or cylindrical-sectioned members mounted on spiders connected to hubs which are fitted over the insulating shaft 633. The switch elements include offset finger portions adapted to contact the various spring contact members 621 to 628 in a manner to be described more in detail hereinafter.

The electrical connection of contact elements 621 to 628 to the various clutch-operating members and power supply sources are as follows: Contact member 621 connects directly through lead 50h to slip ring 52f of clutch 50a; contact 622 connects through leads 605a, rheostat 610 and lead 605 to the positive side of battery 601 and generator 602; contact 623 connects through lead 50g to slip ring 50e of clutch 50a; contact 624 connects through lead 250d to a commutator of clutch operating motor 250; contact 625 connects through lead 250a to the field coils of reversing motor 250; contact 626 connects through lead 606 to the positive side of battery 601 and generator 602; contact 627 connects through lead 250b to the field coils of reversing motor 250; contact 628 connects through split lead connection 250d to commutator on motor 250; 250c designates a commutator and lead from the reversing motor 250 to the common negative terminal 604 of battery 601 and generator 602. The rotary switch 620 may be provided with a hand-controlled lever 637a, or an automatically-controlled lever 640, both of which are secured to opposite ends of the shaft 632. An automatic cutout switch may be used to open the circuit of generator 602 when the engine is stopped.

The contacts of the rotary switch 620 are connected in four different ways by the contact fingers of switch members 634, 635 and 636. This contact arrangement is shown schematically in Fig. 23. On moving switch handle 637a to the first-operating position, switch elements 634, 635 and 636 will connect contacts 621 to 622, 625 to 626 and 627 to 628. This connection will cause current to flow from battery 601 through rheostat 610 and contact 622 to contact 621 and lead 50h, thereby energizing solenoid 52c and moving clutch-plate 54a to the right. At the same time lead 606 will pass current from the positive side of the battery 600 to contact 626, contact 625 and coil lead 250a of reversing motor 250. Switch element 636 will permit a flow of current from the negative side of battery 600 through the commutator lead 250d of motor 250 and lead 250b of the motor coil. In this switch position it will be seen that when clutch-plate 54a is moved or energized by solenoid coil 52c, motor 250 is simultaneously energized and lever 246 of output clutch control 240 is moved by the action of rack and pinion members 247 and 252. The motor runs clockwise and clutches the clutch to the right side.

When the rotary switch 620 is moved to the second position, element 634 bridges contacts 622 and 623, switch element 635 bridges contacts 625 and 626, and switch element 636 bridges contacts 627 and 628. This change will cause a shift in the current flow from lead 50h to lead 50g and slip ring 50e, thereby energizing solenoid coil 50b and causing clutch-plate 54a to be pulled to the left. Rear clutch operating lever 240 is not disturbed. When in the third operating position, switch element 634 again bridges contact elements 621 and 622, causing clutch plate 54a to be pulled to the right again. Switch element 635 is caused to bridge contacts 624 and 625, and switch element 636 bridges contacts 626 and 627. The shifting of switch elements 635, 636, thus causes a reversal of motion in motor 250 and results in a throwing of clutch control member 240 to the left. In the fourth switch position, switch element 634 bridges contacts 622 and 623, again causing clutch-plate 54a to be moved to the left, and clutch control member 240 remains in the lefthand position.

The above manually described switch control operations may be automatically performed by means of the control member 640. This member 640 comprises a lever arm 641 having an arcuate end-section 642 with a central apertured boss 643 fitted on the end of shaft 632 and keyed thereto. The segment or section 642 of the switch member is provided with a plurality of peripheral notches 644, 645, 646, 646a and 647 corresponding, respectively, to the neutral, first, second, third and fourth operating positions of the rotary switch. The notches 644 to 647, inclusive, are adapted to be engaged by spring-urged pin 648 set in the casing of switch mechanism 620 and secured therein by closure or locking means 649. The lever arm 640 is controlled by an automatic governor 650. This mechanism includes oppositely disposed weights 651 mounted on link arms or bridge arms 652 connected to drive shaft 653 and sliding sleeve 654. Shaft member 653 is connected, in a suitable manner, to the output shaft of the transmission and is adapted to fit into member 654 and the two members are normally spaced and held apart by coil spring 655. A ball-bearing bushing 656 has its outer race connected to sleeve member 654 and its inner race is connected to a stub-shaft or link connection 657. The latter, in turn, is connected to a link arm 658, which is connected to snap-lever 641a by means of pin 659. A second pin 660 is mounted on lever arm 641 and a coil spring 661 is secured between the pins 659 and 660. Springs 661 and 649 are so designed as to maintain notched segment 642 of member 640 locked in position during normal operation at any of the various speeds of the motor. Due to the ball-bearing 656, the governor 650 is adapted to be freely rotated by the driving shaft connection 653. When the vehicle is started up in first speed the governor 650 is rotated and the centrifugal force developed causes the balls or weights 651 to fly outwardly. This movement causes the link arm 652 to pull the shaft 653 and sleeve 654 closer together against the normally expanded action of coil spring 655. When this pressure has exceeded a certain point the sleeve 654 is moved to the right, the shaft 653 being normally mounted for rotation in a fixed position, and link arm 658 is pulled to the right, overcoming the spring tension of locking pin 648 and spring 661, so that segment 642 is snapped from one notch position to the next succeeding position. This snapover movement causes switch 620 to be rotated through one quadrant. Upon further increases in speed the lever arm 641 is successively snapped into the other switch positions. Upon deceleration or slowing down of speed of the vehicle, the reverse operations take place in the same uniform manner, but at a lower speed due to the resistance of the spring-urged locking pin. For light-weight rotary switches, snap-spring 661 may be omitted.

To vary the friction or gripping obtaining in the clutch 50a, which is sometimes desirable to take care of varying engine loads under different conditions, the rheostat 610 may be operated by foot pedal 616 so as to vary the amount of magnetic flux developed in solenoid coils 50b and 52c.

Referring now to Fig. 24, there is shown yet another transmission which will permit the attainment of four forward speeds and two reverse speeds. Coupled with this modified gear transmission is a hydraulically operated input clutch mechanism.

Considering the gear transmission, as such, the gear box 300 is provided with the usual input shafts 160 and 170 terminating, respectively, in gears 161 and 171 meshed with gears 82 and 81 of gear shaft 80. Double clutch 162 is mounted on output shaft 190, provided with teeth or lugs 161b and 193a adapted to engage similar lugs 161a and 193b formed on gears 161 and idler gear 193 which is mounted on shaft 190 to freely rotate thereon and is permanently enmeshed with gear 83 of gear shaft 80. A collar 194 formed on or secured to shaft 190 serves as an abutment for idler gear 193. A second gear wheel 195 is mounted on shaft 190 and keyed thereto as indicated at 196, preferably being abutted against a boss on gear 193 to maintain the latter in fixed position between itself and the shoulder or flange 194. The casing 300 is provided with end-plates 300a, 300b into which the several shafts are bushed in aligned relationship.

An idler reversing gear 197 is mounted on shaft 86a and is adapted to be moved longitudinally of the fixed shaft by means of fork 420 of reversing shifting mechanism to be described more in detail hereinafter. The reversing gear 197 is adapted to be moved forwardly by the fork 420 into meshing engagement with gear 84 on shaft 80 and gear 195 keyed on shaft 190.

In the operation of the gear box it will be seen that with double clutch 162 in the right position, first and second speeds are obtained by varying the input power connection through input shafts 160 and 170, respectively. When double clutch 162 is moved to the left position the third and fourth forward speeds are obtained. When the drive is to be placed in reverse, clutch 162 is to be placed in neutral and reversing idler gear 197 is shifted to the left to mesh with gears 84 and 195, as described immediately above.

A novel double-friction clutch is also shown in connection with this gear transmission, but is adapted to be used with any other type of gear transmission. In addition, the double-friction clutch 700, now about to be described, is also adapted to be hydraulically operated either manually or automatically, as will presently appear.

Considering the double friction clutch more in detail, the body portion 700 may be provided with the usual starting ring gear 53. The clutch body, proper, consists of three parts: a body 701, an end-plate 702 and a central plate 703. These parts are firmly secured together to form an operative unit. Central plate 703 is provided with a plurality of concentric holes or taps adapted to receive stub shafts 710 freely movable in the plate 703 and having mutually parallel annular friction plates 711 and 712 fixedly secured on either side thereof and adapted to be moved therewith. Plates 711, 712, respectively, when moved are adapted to contact and force clutch plates 58 and 59 into frictional engagement with the clutching body, thereby connecting the same with either input shaft 160 or input shaft 170 of the gear transmission. The clutching members herein may have conical mating surfaces.

The main body portion 701 of the clutch mechanism is provided with a pair of channels or inlets 701a, 701b and fluid connection with annular channels 704, 705, formed in the periphery of center clutch-plate 703. These peripheral channels are closed by a common ring or plate 703a. Taps or channels 706, 707, respectively, connect these two annular grooves to annular expanding members, or, as shown, to a plurality of expansible sac members 708, 709, mounted on either side of central plate 703 and respectively and alternatively adapted to engage and move friction plates 711, 712 upon flow of pressure fluid therein.

Pressure fluid is supplied to the clutch mechanism in a manner and by an apparatus now to be described. The engine shaft 41 is provided with channels 41a, 41b in alignment with annular grooves or channels 42a, 42b, formed in engine bushing 42. The channels 41a, 41b, are in direct and permanent fluid communication with channels 701a, 701b, respectively. The engine bushing 42 is mounted in the engine housing 10 and more particularly in a column or web portion 43 thereof. This standard or supporting column or base member is provided with taps or pipes 44, 45, 46 and 47. Pipes 44 and 45 feed channels 42a and 42b, respectively. Orifices 46 and 47 are in direct connection with the engine body. The channels 44, 45, 46 and 47 are, respectively, aligned with apertures 801, 802, 803 and 804, formed in the top 805 of the clutch control and automatic governing body member 800. The upper portion of the member 800 is tapped to form a pump or valve chamber 805 adapted to receive a piston valve 810 secured in place by lock bushing 811 and controlled by a flexible shaft 812, the shaft being connected to the common gear shift and control lever 401. The piston member 810 is provided with two ring portions 813, 814, which divide the chamber 805 into three sections. Inlet 815 permits inflow of pressure fluid from automatic or manual control mechanism 850 to the valve chamber 805. An inlet 817 formed at the bottom of section 850 provides means for admitting engine oil or hydraulic brake fluid. Where engine oil is used as the motivating fluid the normal oil pump of the engine will preferably be increased in size to take care of such added requirements, or a separate pump may be installed. A valve control 851 controlled by a lever arm 860 mounted on fulcrum 861 provides means for controlling the amount of clutch-actuating fluid introduced into the system.

In operation, clutch valve control member 810 may be moved to permit inflow of braking fluid from the valve chamber through conduits 44 and 41a, 710a, to pressure-responsive members 701, thereby forcing friction plates 711 into frictional engagement with clutch-plates 58. In this manner, connection is established between the engine shaft 41 and the central input shaft 160. Upon reversing the member 810 by moving it to the left, conduit 45 is placed in pressure communication with the hydraulic fluid supply, which fluid is forced through conduits 45, 41b and 701b to actuate pressure-responsive members 709, thereby forcing clutch-plate 712 into engagement with clutch members 59. This operation establishes power flow between the engine shaft and clutch body to the hollow input shaft 170. When the clutch plates are so reversed the fluid originally in pressure-responsive member 708 is forced back through conduits 701a and 41a to conduit 44 and thence discharged into the engine through conduit 46. Conversely, when plate 711 is again forced into contact with clutch-plates 58, pressure-responsive members 709 are emptied through conduit 701b, 41b and 45 through aperture 47 back into the engine. In the neutral position the valve piston 810 is so arranged as to have the segments 813, 814 close off the apertures 45 and 44, respectively.

The presure-control mechanism controlling the fluid from inlet 817 includes a piston 851 motivated by cross-arm 860. The plunger 851 also includes a chamber 852 having apertures 853 adapted to be moved into engagement with aperture 817 or outlet 816 of the valve body. A plug 818 closes off the pressure chamber so formed. The plunger 851 is normally maintained in closed position by means of coil spring 819, the pressure of which is originally adjusted by the closure member 818.

The governor system for the automatic operation of these valve members will now be described.

Considering the construction shown in Figs. 31 and 32, the pressure-regulating plunger 851 is controlled in the following manner. Two centrifugal regulators 870, 870a, are respectively connected to and driven by the engine and the wheels of the car by means of flexible shafts 871, 872. The flexible shafts are secured to rotating governor spindles designated generally by the numeral 873 and bushed in ball-bearing races 874. The governor members, proper, 875, work against coil springs 876 and are provided with spindles 877 adapted to align the members and maintain them in rotative position in sleeves 878 secured by links 879 to link-arm 860 controlling the pressure-control valve.

With both regulators at a standstill the car is always in neutral. In this position, as noted above, opening 817 is shut off by section 852 of the plunger. As the engine speeds up, regulator 870 picks up speed and the weights 875 are spread out, causing the lever arm 860 to be pulled inwardly, thereby moving valve plunger 851. When the apertures 853 are in full communication with the pressure-fluid inlet, the pressure-fluid flow is established to the clutch and the latter is engaged with a pressure proportional to the increased speed above the starting point. Once the clutch starts to engage and the car starts to move, the regulator 870a is set in motion. The effect of this regulator is added to that of regulator 870 and the clutch is engaged with full pressure. Owing to the incremental or added action of regulator 870a the engine can now run at a much lower speed without causing disengagement of the clutch. The springs and weights of the governors 870 and 870a are so chosen as to cause operation of the clutch control members at predetermined engine and car speeds. The speed of engagement may be manually controlled by emergency cut-off and control member 851a, which may be connected to an operating lever or button. For emergency use an emergency foot pump may be included in the system.

The automatic governors hereinabove described may also be used with electrical and mechanical clutch controls.

Referring now to Figs. 28, 28a, 28b, 29, 29a, 29b, 30, 30a, and 30b, the operation of the clutch and gear shift controls, both manually and automatically, will be described. Shifting is done by lever 401, which shifts clutch 162 and idler gears 85 and 197. Clutch 162 is controlled by yoke arm 410 while idler gear 196 is controlled by arm 420. Considering Figs. 29 and 30 more specifically, and in diagrammatic arrangements, the finger 402 of lever 401 is shown in the top three sketches. In Figs. 28 and 28a, in the left-hand showing, the fork 410 has been shifted to the back and finger 402 to the left. This engages clutch 162, Fig. 24, with gear 193 and disk 58 on the friction clutch, Fig. 24, and gives the first speed.

While a number of transmissions have been shown and described hereinabove, which are characterized by the common feature of an improved gear, together with associated double clutches adapted to control the operation of the car at different speeds without requiring shifting of gears, the use of two gears in such transmissions to permit power in two directions, requires that the ratios in the transmissions may be in a certain relation to each other. In other words, the gear ratios in any given transmission are not available at will but can be chosen only from such predetermined available ratios. For example, if in a given gear transmission the first ratio is 3 to 1, the second ratio, 2 to 1, and the third ratio, 1 to 1, then the fourth ratio must necessarily be 1 to 1½. If such a fourth ratio was not satisfactory for the purpose desired, and a ratio of 1 to 1¼ was satisfactory, it would be necessary to add another set of gears and another clutch to secure this desired extra ratio. However, this extra ratio or ratios can be obtained by adding a pair of gears and two free-wheeling clutches to the transmission as is shown in Fig. 33 and now to be described more in detail.

Referring more specifically to Fig. 33, the modified gear transmission adapted to give the extra ratios, includes the usual central input shaft 60, first hollow input shaft 70, and hollow output or intermediate shaft 90, suitably bushed in the gear casing 30. The gear shaft 80 is provided with a keying slot 80' and is centrally bushed at 34a by means of bushings or ball-bearing races 12'. Gear 81' is keyed on the shaft 80 and is in constant mesh with gear 71 of hollow input shaft 70. Gear 61 of central input shaft 60 is provided with an auxiliary gear 61' of a different gear ratio. Both these gears are mounted on shaft 60 and adapted to rotate therewith. Gear 61 is constantly in mesh with ring gear 82', and gear 61' is constantly in mesh with a separate ring gear 82'', both of which are connected to a hollow shaft 80'' keyed on shaft 80, through free-wheeling units 82a and 82b, respectively. Free-wheeling unit 82a normally works in a positive direction, and free-wheeling unit 82b works in a negative direction. The remainder of the gear transmission is substantially the same, as previously described, and more particularly set out in the description of Fig. 1.

The power flow for the gear transmission shown in Fig. 33 is as follows:

For first drive, power flow is from gear 61' to gear 82'', thence through shaft 80 to gear 83, and sliding gear 92 to hollow output shaft 90.

For second drive, power flow is from gear 71 to gear 81', shaft 80, gear 83, sliding gear 92 and hollow shaft 90.

For direct drive, power flow is directed directly through the central shaft 60.

For fourth drive, power flow is from gear 71 to gear 81', shaft 80, gear 82' and gear 61.

From the description given immediately above it will be seen that gears 61, 82' and gear 61', 82'', are independent and any desired gear ratio can be obtained. This particular drive involves certain added mechanical features which will give greater smoothness in driving, thus permitting an distinct increase in flexibility of operative control. As an idea of this flexibility of control, consider a series of desired ratios: first ratio, 5 to 1; second, 1.8 to 1; third, 1 to 1; fourth, .7 to 1. These results can be obtained by establishing the gear ratios:

$$\frac{\text{Gear } 81'}{\text{Gear } 71}=.9;\ \frac{\text{gear } 61}{\text{gear } 82'}=.777;\ \frac{\text{gear } 82''}{\text{gear } 61'}=2.5;$$

and $$\frac{\text{gear } 92}{\text{gear } 83}=2$$

It will be seen that with the transmission in first speed, as set out above, the ratio between the engine and the output shaft is $2.5 \times 2 = 5:1$, provided that the engine is driving, in which case the free-wheeling clutch 82b is in engagement. If, while this same speed ratio is being maintained the car should run ahead of the engine in speed, the free-wheeling clutch 82b will be idling,—i. e., will be in a non-power transmitting condition, while, at the same time, the free-wheeling clutch 82a will be brought into operative engagement. However, with free-wheeling clutch 82a in engagement, the ratio in the transmission is determined by $$\frac{\text{Gear } 92}{\text{Gear } 83}\times\frac{\text{gear } 82'}{\text{gear } 61}=2\times\frac{1}{.777}=2.56 \text{ to } 1$$

Thus, for the first ratio with the engine driving, the gear ratio is 5 to 1, while with the car driving the gear or transmission ratio is 2.56 to 1. With the engine driven at 2000 R. P. M. the output shaft of the transmission will run at $$\frac{2000}{5}=400 \text{ R. P. M.}$$

When the engine idles down from any cause the car will drive the engine. With the output shaft being driven at 400 R. P. M., then the engine will be driven at a speed of $400\times2.56=1024$ R. P. M. This computation shows that the engine can idle freely between speeds of 2000 and 1024 R. P. M.

This spread or distribution of engine speed will do away with any jerking while the gear transmission is in the first ratio, yet this is not complete free-wheeling.

With the gear transmission in second and third ratio, no free-wheeling action is present.

In the high speed or fourth gear ratio, a similar picture to that obtaining in the first ratio, is noted. For example, with the engine driving the gear ratio is $$\frac{\text{Gear } 81'}{\text{Gear } 71}\times\frac{\text{gear } 61}{\text{gear } 82'}=.9\times.777=.7:1$$

while with the car driving the gear transmission ratio is $$\frac{\text{Gear } 81'}{\text{Gear } 71}\times\frac{\text{gear } 61'}{\text{gear } 82''}=.9\times.4=.36:1$$

If the engine, under these conditions is run at 2000 R. P. M. the output shaft is driven at $$\frac{2000}{7}=2857 \text{ R. P. M.}$$

If the car is driven at 2857 R. P. M. the engine will be driven at $2857\times.36=1028$ R. P. M. Here, again, with this gear ratio obtaining the engine can idle between speed of 2000 and 1028 R. P. M. without the car being in complete free-wheeling.

This desired feature, as already noted, adds a certain degree of flexibility and smoothness to driving, and appreciably enhances the utility and desirability of the gear transmissions hereinabove described.

As noted hereinabove, the operation of the several clutch controls and gear shifts may be conveniently and expeditiously controlled by automatic means or by hand-control means. In the Figs. 28, 28a and 28b are shown hand-control means combining these desired features, the operation of which will now be generally described. A hand-gear lever or gear-shift lever 401 is provided with a fork-engaging finger 402 and is mounted for universal rotation in a casing member 400. The member or casing section 400 is provided with a continuous slot 404 adapted to receive yokes 410 and 420 of the idler gear and reversing idler gear, respectively, which gear members are adapted to slide on or move with suitable shafts. The ball or swivel section 410a of the gear shift lever may be provided with a clutch valve control cable or member 812 and is adapted to control such member by rotation about its own longitudinal axis. Thus, the clutch members of the transmission system can be controlled in any desired manner as hereinabove described, by mere manual rotation of the unitary control lever 401.

With respect to the common control of the idler gear 92 by fork 410 and the reversing idler gear 85 by fork 420, the operation is as follows: the forks 410 and 420 are adapted to slide in slot 404 and are held in neutral position by means of spring-urged fingers or pins 430 and 440, respectively. Thus, with particular reference to Fig. 28b it will be seen with the gear control finger 402 in neutral position forks 410 and 420 are held in place and against movement by the spring-urged pins or locking members 430 and 440, respectively. The fork members 410 and 420 may be provided further with locking bars indicated generally by the numeral 421, having notches 422 adapted to be engaged by balls 423 and urged into locking relation therewith by means of springs 424 which are adjustably tensioned and secured by locking nuts 425. This arrangement permits the maintenance of the forks in any one of a number of desired positions, without permitting them to shake loose. The actuating finger 402 of the shifting lever is adapted to be moved successively, or alternatively, into any one or a number of recesses or depressions 405, 406, 407 and 408 formed in the casing or member 400. To be moved into these several positions the finger must be elevated or depressed against the action of spring-urged members 440 or 430, and then the handle moved to one side or the other to permit the movement of the forks into a desired position, determined by the notches 422 and the locking member or ball 423. It is to be noted that the finger 402 and the forks 410 and 420 are so constructed and arranged as to require the positive movement of the locking members a sufficient distance to permit one only of the forks 410 or 420 to be moved at any given time. In this manner it will be seen that when the finger 402 is moved so as to depress locking member 430 a sufficient distance to permit fork 410 to be moved sideways, in either direction, the spring-urged locking member 440 will follow the finger 402 down into the fork 420 and positively lock the same. It will be seen, further, that the reverse of this operation will permit the movement of fork 420 and require the positive locking of fork 410 in the neutral position. Thus, the gears actuated by forks 410 and 420, respectively, cannot be put into operation at one and the same time. There must be a definite and positive choice. However, due to the auxiliary locking means 422, 423, these forks cannot be shaken loose. With the structural arrangement shown, in Figs. 24 to 28b inclusive, four forward speeds and the two reverse speeds are obtained with the relative positions indicated in Figs. 29, 29a, 29b, 30, 30a and 30b, where the relative positions of the members 402, 410 and 420 are shown. Thus, for the first speed, as shown in Fig. 29, reversing idler gear control fork 420 remains in neutral position locked by member 440, fork 410 is moved to the right-hand position and actuating finger 402 is dropped into the containing slot or pocket 408. For the second speed, as indicated in the view of Fig. 30, the forks 410 and 420 remain in the same position as in the first speed, but finger 402 of the gear shift lever is moved into pocket 405. This shift from pocket 408 to pocket 405 actuates the clutch control member 812, giving the desired clutch position for the speeds indicated.

In Figs. 29a and 30a, we have, respectively, the third speed or direct drive, and the fourth speed or "overdrive." In these positions the fork 410 is moved to the left of the device, as indicated in the figures and the gear levers move to cause finger 402 to engage slots 407 and 406, respectively. Here, again, it is to be noted that the lateral or sidewise movement of the forks causes the appropriate gear engagement, while the up-and-down movement of the gear lever, as indicated by the position of finger 402, causes the appropriate clutch control.

The showing in Figs. 29b and 30b, indicate the positions for the first and second reverse speeds. In these figures it will be noted that the gear-control fork 410, controlling the idler gear 92, is locked in neutral position by locking member 430, while reversing idler fork 420 is shifted to the left and gear control lever finger 402, respectively occupies slots 407 for the first reverse speed, and the upper left-hand slot 406 for the second reverse speed. These speeds and the clutch operation and control of the same, together with the appropriate gear hookups, have been described hereinabove and will not be repeated here.

The several gear and clutch controls herein, and as variously set forth and described hereinabove, may be operated by a variety of mechanisms, including automatically and manually controlled devices. All of such devices, including the several gear shifts, as well as clutch control mechanisms, may be operated by hydraulic cylinders, vacuum cylinders, as well as electrically and mechanically, the control means being adapted for so-called "finger-tip control," as by means of appropriate buttons or small levers mounted on or near the wheel, steering-post or dashboard.

It will now be appreciated that there has been disclosed novel power transmission devices, including double clutches and gear transmissions in which various desired speeds may be attained solely by operation of the clutch members. It will be appreciated, further, that the novel power transmissions herein disclosed may be automatically operable or manually controlled, when desired, and however controlled, are so constituted and arranged as to give a wide choice in driving speeds, together with greater flexibility of control, involving smoother operation than has heretofore been possible.

It will also be noted that the power transmission devices herein disclosed are adapted to be included with or incorporated in existing structures or devices, without requiring re-design of such members.

While certain novel features of the invention have been disclosed and are pointed out in the annexed claims, it will be understood that various omissions, substitutions and changes may be made by those skilled in the art without departing from the spirit of the invention.

What I claim is:

1. A gear transmission system including, in combination, a gear box, an adapter casing secured to the gear box and to an engine housing, a combination double clutch and fly-wheel in the adapter housing and connected to the engine shaft, a central drive shaft mounted in the gear housing, a clutch element splined adjacent one end of the said drive shaft and in the said clutch body, a plurality of clutch elements splined adjacent the other end of said drive shaft, a fixed gear on the shaft substantially centrally thereof and in mesh with a second gear shaft; concentric hollow shafts mounted around the central drive shaft and on either side of the fixed gear thereof, the first hollow shaft being connected at one end to a clutch element of the input clutch and adjacent its other end being provided with a gear in mesh with the gear shaft, the second hollow shaft serving as a support for a sliding gear slidably splined thereon and provided at its other end with clutch elements splined thereto, the clutch elements at the output ends of both the central drive shaft and the second hollow transmission shaft being adapted for frictional engagement with splined friction plates of an output clutch member, the said output clutch member having a housing connected directly to the output shaft of the transmission system; a reversing idler gear mounted in the gear housing and in mesh with the gear shaft; and means to alternatively move the sliding gear into engagement with either the gear shaft or the reversing idler gear.

2. In an apparatus of the type described in claim 1, the improvements comprising double clutches at the input and output ends of the transmission system, and an intermediate gear train including means to connect the said clutches in any combination whereby to secure four forward speeds and two reverse speeds.

3. A gear transmission system including, in combination, a gear housing, means to divide the gear housing into three chambers, a combination fly-wheel and double input clutch mounted in the first said chamber, a pair of concentric shafts including a central shaft and a hollow shaft respectively connected to the clutch elements of the first double input clutch, such shafts extending into and supported by bushings in a second gear chamber; a pair of hollow gear shafts mounted on fixed shafts in said gear chamber; gears in said chamber on said hollow shafts in mesh with the said concentric input shafts; an output double clutch in the third said chamber of the housing; one of the clutch elements of said output clutch being splined to a central drive shaft; a second hollow drive shaft mounted around the central drive shaft and extending from the gear chamber housing through and into the output clutch housing, the said second hollow shaft being bushed in the gear chamber housing and provided in said housing with a sliding gear splined thereon and adapted to be moved into engagement with the gear shaft or a reversing idler gear, the end of the second hollow drive shaft in the output clutch chamber being fitted with splined clutch elements of the output clutch; means severally connected to the input clutch and to the output clutch to cause the predetermined combination of various clutch elements with the several clutch bodies to give desired gear ratios in the transmission system.

4. In an apparatus of the type described in claim 3, an inert double clutch body having a pair of solenoids mounted therein and in electromagnetic relation to the clutch plate, and electrical connections in said solenoids to cause the energization of either of the solenoids, as desired.

5. In an apparatus of the type described in claim 3, the improvements comprising an output double clutch operating mechanism, including a clutch plate and operating lever therefor, means mounted in the clutch housing chamber for moving the clutch plate, said means including a lever arm affixed at one end and provided at its other end with an arcuate rack adapted to be engaged by a motor-driven driving member.

6. A gear transmission assembly, comprising, in combination, a gear housing and an adapter housing mounted thereon, the adapter housing being connected to an engine housing; an input double clutch mounted on an engine shaft and in the adapter housing, double clutch elements in the double clutch, said double clutch being adapted to serve as an engine fly-wheel; concentric shafts connected, respectively, to the double clutch elements; means for moving the said clutch elements alternatively into engagement with the clutch body; gears mounted adjacent the ends of the central drive shaft and the hollow drive shaft, respectively, and positioned in the gear housing and bushed therein; a gear shaft bushed in the housing and provided with fixed gears severally in mesh with the gears on the concentric input shafts; an output shaft mounted in the gear housing and in alignment with the central input shaft; a rotatably fixed gear on the output shaft, clutch teeth elements or dogs mounted on said gear and on the terminal gear of the central input shaft, a double clutch element mounted on the output shaft and adapted for sliding movement between the two gears having the clutch elements thereon; a sliding gear slidably mounted on the output shaft, a fixed gear on the gear shaft and a reversing idler gear in the gear housing in mesh with the gear shaft, the sliding gear being adapted to engage alternatively with the said fixed gear and the reversing idler gear.

7. An electrical control system for power transmissions, which includes a plurality of double clutches, comprising, in combination, an input double clutch connected to a power input shaft and serving as a fly-wheel therefor, a pair of concentric, secondary shafts secured to the double clutch elements, a gear train connected to the secondary shafts; a second output double clutch adapted to be alternatively connected to the gear train or the central secondary shaft, mechanical means for operating said output double clutch; means for electrically operating the two clutches, including rheostat-controlled solenoids in the first clutch; a power supply for operation of the solenoids, including a storage battery and an engine-operated generator; a reversing motor connected to the operating means for the output double clutch; common or gang switching means simultaneously controlling both of said double clutches, said gang switch including a drum switch having a plurality of contacts severally connected to the current supply sources and to the parts to be electrically actuated; a rotary shaft in the switch casing and provided with a plurality of switching members; the said switching members being adapted, in various positions of the switch, to selectively couple and bridge, as switching elements, desired switch contacts and alternatively change the direction of current flow whereby to reverse the operation of the clutching elements.

8. A gear transmission, including concentric input shafts, two gears mounted on the end of the central input shaft, said gears being of different diameters; a gear mounted on the end of the outer concentric input shaft, a gear shaft having gears in mesh with the gears on said input shafts, the gears on said gear shaft in mesh with the gears on the central input shaft being provided with "free-wheeling" mechanisms, and another shaft concentric with said central shaft having a gear thereon for meshing with another gear on said gear shaft.

9. In a power transmission system, a power input shaft, a power output shaft, multiple clutches each having a clutch body connected with one of said shafts, a central shaft extending between and connected to clutching elements of each of said clutches, hollow shafts surrounding said central shaft and connected respectively to other clutching elements of said clutches, a gear shaft including first and second gears constantly in mesh with gears fixed to said central shaft and the first hollow shaft, third and fourth gears fixed to said gear shaft, an idler gear constantly meshing with said fourth gear, and a gear slidably secured on the second hollow shaft to be shifted alternately into mesh with said third gear and said idler gear to drive the second hollow shaft in forward or reverse.

10. In a power transmission system, a power input shaft, a power output shaft, multiple clutches each having a clutch body connected with one of said shafts, a central shaft extending between and connected to clutching elements of each of said clutches, hollow shafts surrounding said central shaft and connected respectively to other clutching elements of said clutches, a gear shaft including first and second gears constantly in mesh with gears fixed to said central shaft and the first hollow shaft, third and fourth gears fixed to said gear shaft, an idler gear constantly meshing with said fourth gear, a gear slidably secured on the second hollow shaft to be shifted alternately into mesh with said third gear and said idler gear to drive the second hollow shaft in forward or reverse, and means for actuating said multiple clutch members and said shiftable gear separately or in any desired combination and sequence of actuation whereby to impart a plurality of forward speeds and a plurality of reverse speeds to said output shaft.

11. A gear transmission system including in combination, a power input shaft, a power output shaft, a central drive shaft intermediate said input and output shafts, a gear secured to said central shaft intermediate its ends, hollow shafts concentric with said central shaft, one on each side of said gear, a double clutch adjacent each end of said central shaft, including clutch bodies secured to the input and output shafts, respectively, and double clutching elements connectible with and disconnectible from each of said bodies, each of said clutches having a clutching element secured to an end of said central shaft and another clutching element secured to one of the aforesaid hollow shafts, a gear mounted on and revolving with each of said hollow shafts, a gear shaft mounted to one side of said central shaft and hollow shafts, and a plurality of gears secured to said gear shaft to mesh with the aforesaid gears on said central shaft and hollow shafts.

12. A gear transmission system including in combination, a power input shaft, a power output shaft, a central drive shaft intermediate said input and output shafts, a gear secured to said central shaft intermediate its ends, hollow shafts concentric with said central shaft, one on each side of said gear, a double clutch adjacent each end of said central shaft, including clutch bodies secured to the input and output shafts, respectively, and double clutching elements connectible with and disconnectible from each of said bodies, each of said clutches having a clutching element secured to an end of said central shaft and another clutching element secured to one of the aforesaid hollow shafts, a gear shaft mounted to one side of said central shaft and hollow shafts and having a plurality of gears thereon, one in constant mesh with said gear on the central shaft, a gear on the first of said hollow shafts in constant mesh with a second gear on said gear shaft, a gear slidably splined on the second of said hollow shafts and adapted to mesh with a third gear on said gear shaft, a reversing idler gear in constant mesh with a fourth gear on said gear shaft and adapted to mesh with said slidable gear, means for shifting said slidable gear to and from meshing relation with said third and fourth gears, and means for actuating said clutching elements in any desired sequence or combination.

13. A gear transmission system including in combination, a power input shaft, a power output shaft, a central drive shaft intermediate said input and output shafts, a gear secured to said central shaft intermediate its ends, hollow shafts concentric with said central shaft, one on each side of said gear, a double clutch adjacent each end of said central shaft, including clutch bodies secured to the input and output shafts, respectively, and double clutching elements connectible with and disconnectible from each of said bodies, each of said clutches having a clutching element secured to an end of said central shaft and another clutching element secured to one of the aforesaid hollow shafts, a gear shaft mounted to one side of said central shaft and hollow shafts and having a plurality of gears thereon, one in constant mesh with said gear on the central shaft, a gear on the first of said hollow shafts in constant mesh with a second gear on said gear shaft, a gear slidably splined on the second of said hollow shafts and adapted to mesh with a third gear on said gear shaft, a reversing idler gear in constant mesh with a fourth gear on said gear shaft and adapted to mesh with said slidable gear, means for shifting said slidable gear to and from meshing relation with said third and fourth gears, means for actuating said clutching elements in any desired sequence or combination, and another gear shaft, on an opposite side of said central shaft and hollow shafts, having gears thereon in constant mesh with the gears on said central and first hollow shafts.

JOSEPH HERTRICH.